(12) United States Patent
Shenai et al.

(10) Patent No.: US 12,085,943 B2
(45) Date of Patent: *Sep. 10, 2024

(54) INDEPENDENTLY ACTUATED WHEEL SETS FOR LARGE AUTONOMOUS SELF-DRIVING VEHICLES

(71) Applicant: Waymo LLC, Mountain View, CA (US)

(72) Inventors: Nolan Shenai, Mountain View, CA (US); Nathaniel Fairfield, Mountain View, CA (US); Benjamin Pitzer, East Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/134,641

(22) Filed: Apr. 14, 2023

(65) Prior Publication Data

US 2023/0367320 A1    Nov. 16, 2023

Related U.S. Application Data

(63) Continuation of application No. 16/863,450, filed on Apr. 30, 2020, now Pat. No. 11,675,357.

(Continued)

(51) Int. Cl.
*G05D 1/00* (2024.01)
*B62D 7/14* (2006.01)
*B62D 7/15* (2006.01)

(52) U.S. Cl.
CPC ........... *G05D 1/0214* (2013.01); *B62D 7/144* (2013.01); *B62D 7/1509* (2013.01); *G05D 1/0088* (2013.01)

(58) Field of Classification Search
CPC .......... G05D 1/00; G05D 1/0044; G05D 1/02; G05D 1/0214; G05D 3/00; G05D 3/12;
(Continued)

(56) References Cited

U.S. PATENT DOCUMENTS 4,204,697 A    5/1980  Santerre
4,354,568 A   10/1982  Griesenbrock
(Continued)

FOREIGN PATENT DOCUMENTS

EP    0930218 A2   7/1999
GB    471621 A     9/1937

OTHER PUBLICATIONS

Sarkar, Nilanjan, et al., Traction Control of Wheeled Vehicles Using Dynamic Feedback Approach, 1998 IEEE/RSJ Intl. Conference on Intelligent Robots and Systems, Victoria, BC CA, pp. 413-418.
(Continued)

*Primary Examiner* — Anthony R Jimenez
(74) *Attorney, Agent, or Firm* — Botos Churchill IP Law

(57) ABSTRACT

The technology relates to fine maneuver control of large autonomous vehicles that employ multiple sets of independently actuated wheels. The control is able to optimize the turning radius, effectively negotiate curves, turns, and clear static objects of varying heights. Each wheel or wheel set is configured to adjust individually via control of an on-board computer system. Received sensor data and a physical model of the vehicle can be used for route planning and selecting maneuver operations in accordance with the additional degrees of freedom provided by the independently actuated wheels. This can include making turns, moving into or out of parking spaces, driving along narrow or congested roads, construction zones, loading docks, etc. A given maneuver may include maintaining a minimum threshold distance from a neighboring vehicle or other object.

20 Claims, 22 Drawing Sheets

Related U.S. Application Data

(60) Provisional application No. 62/901,859, filed on Sep. 18, 2019.

(58) Field of Classification Search
CPC ........... G05D 2201/00; G05D 2201/02; G05D 2201/0213; G05D 1/0088; G01C 21/00; G01C 21/10; G01C 21/12; G01C 21/34; G01C 21/3407; G01C 21/3415; G01C 21/36; G01C 21/3602; G01C 21/362; G01C 21/3623; G01C 21/3691; B60W 2550/00; B60W 2550/10; B60W 2550/20; B60W 2550/22; B60W 2550/40; B60W 2550/402; B60W 2550/406; H01H 20/00; H01H 30/00; H01H 30/06; H01H 30/08; H01H 30/09; H01H 30/10; H01H 30/12; H01H 30/14; H01H 30/18; H01H 30/18009; B60K 2310/00; B60K 2310/26; B62D 7/00; B62D 7/144; B62D 7/1509; B62D 7/14; B62D 7/15
USPC .......................................................... 701/25
See application file for complete search history.

(56) References Cited

U.S. PATENT DOCUMENTS

| | | |
|---|---|---|
| 4,856,814 A | 8/1989 | Jones |
| 5,329,451 A | 7/1994 | Notsu |
| 5,390,945 A | 2/1995 | Orr |
| 5,417,299 A | 5/1995 | Pillar et al. |
| 5,597,174 A | 1/1997 | Christenson et al. |
| 6,409,199 B1 | 6/2002 | Boyd |
| 6,883,815 B2 | 4/2005 | Archer |
| 8,996,224 B1 | 3/2015 | Herbach et al. |
| 9,598,126 B2 | 3/2017 | Strong et al. |
| 11,331,790 B2 | 5/2022 | Skaaksrud et al. |
| 11,675,357 B2 * | 6/2023 | Shenai .................. B62D 15/025 701/25 |
| 2017/0123431 A1 | 5/2017 | Ghneim et al. |

OTHER PUBLICATIONS

Tilbury, Dawn, et al., A Multisteering Trailer System: Conversion into Chained Form Using Dynamic Feedback, IEEE Transactions on Robotics and Automation, vol. 11, No. 6, Dec. 1995, pp. 807-818.

\* cited by examiner

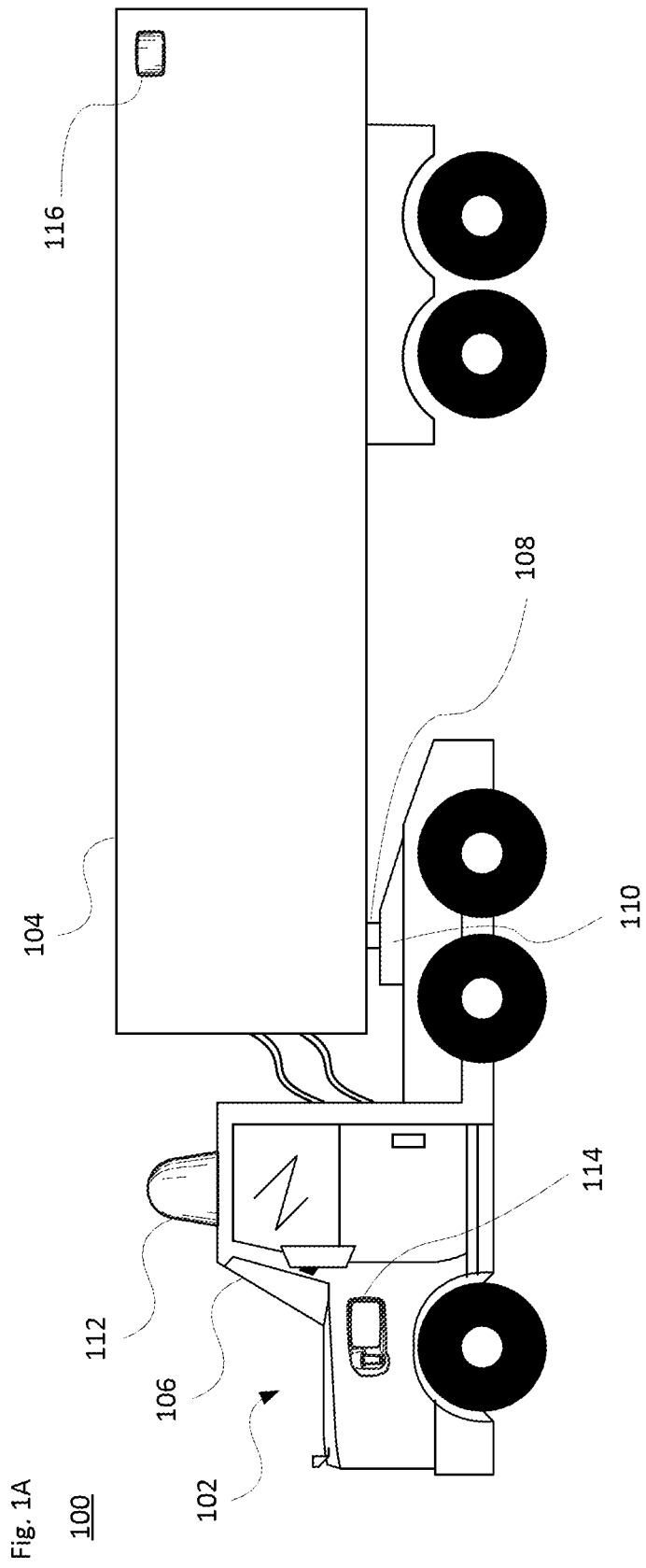
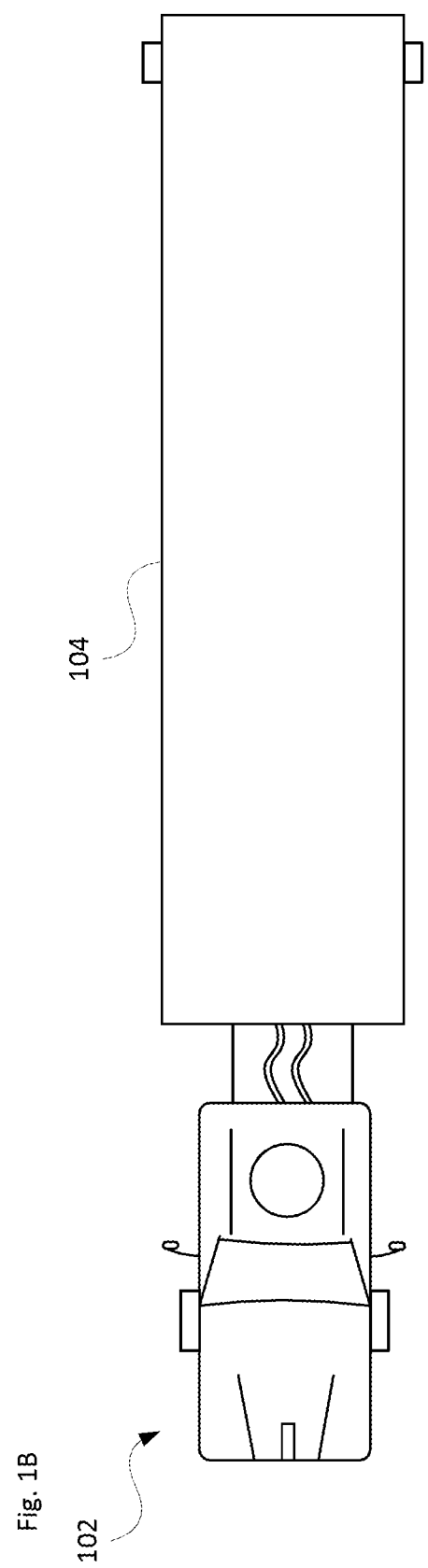
Fig. 1A
Fig. 1B

400

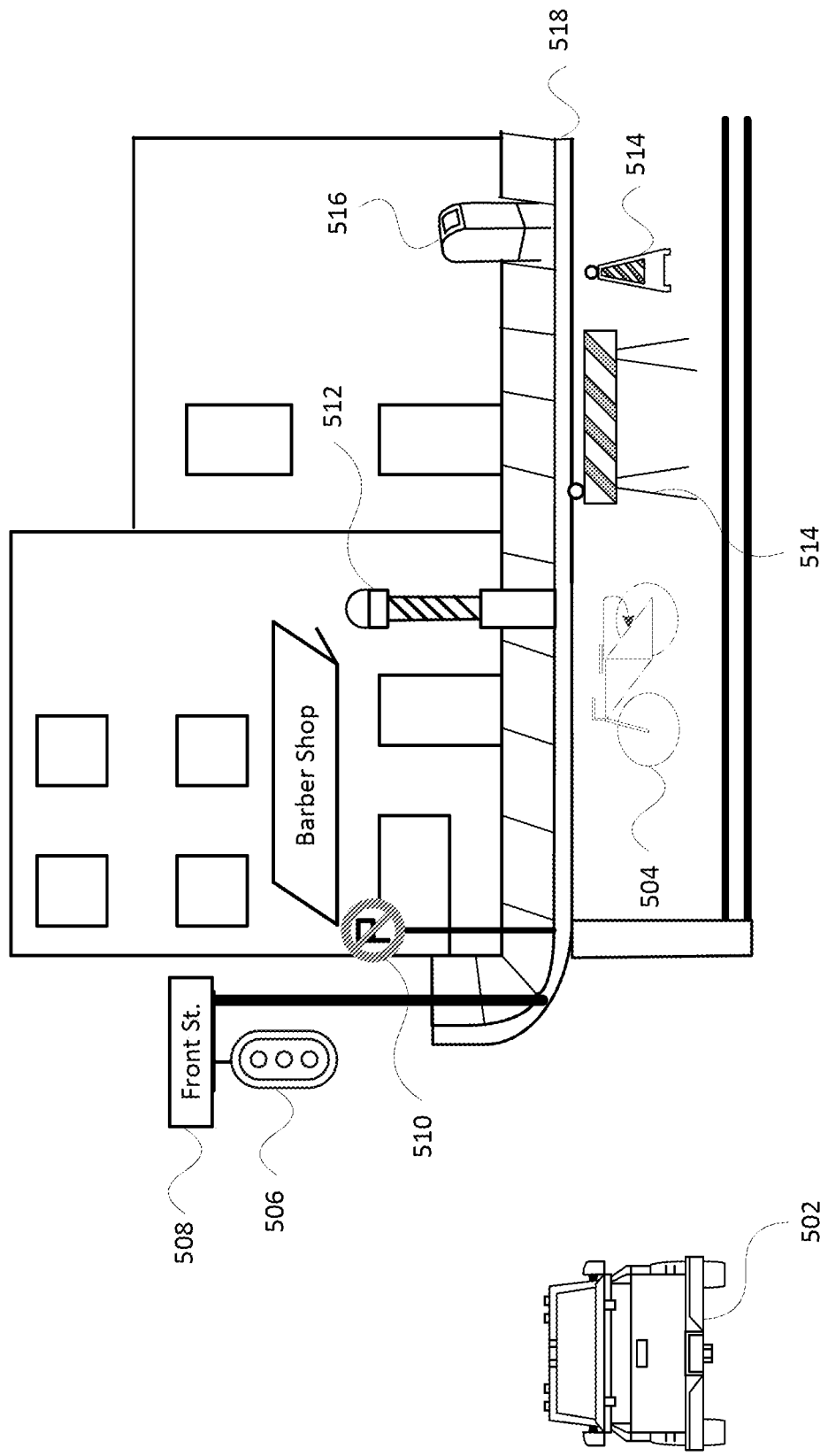

610

940

930

960

950

1000

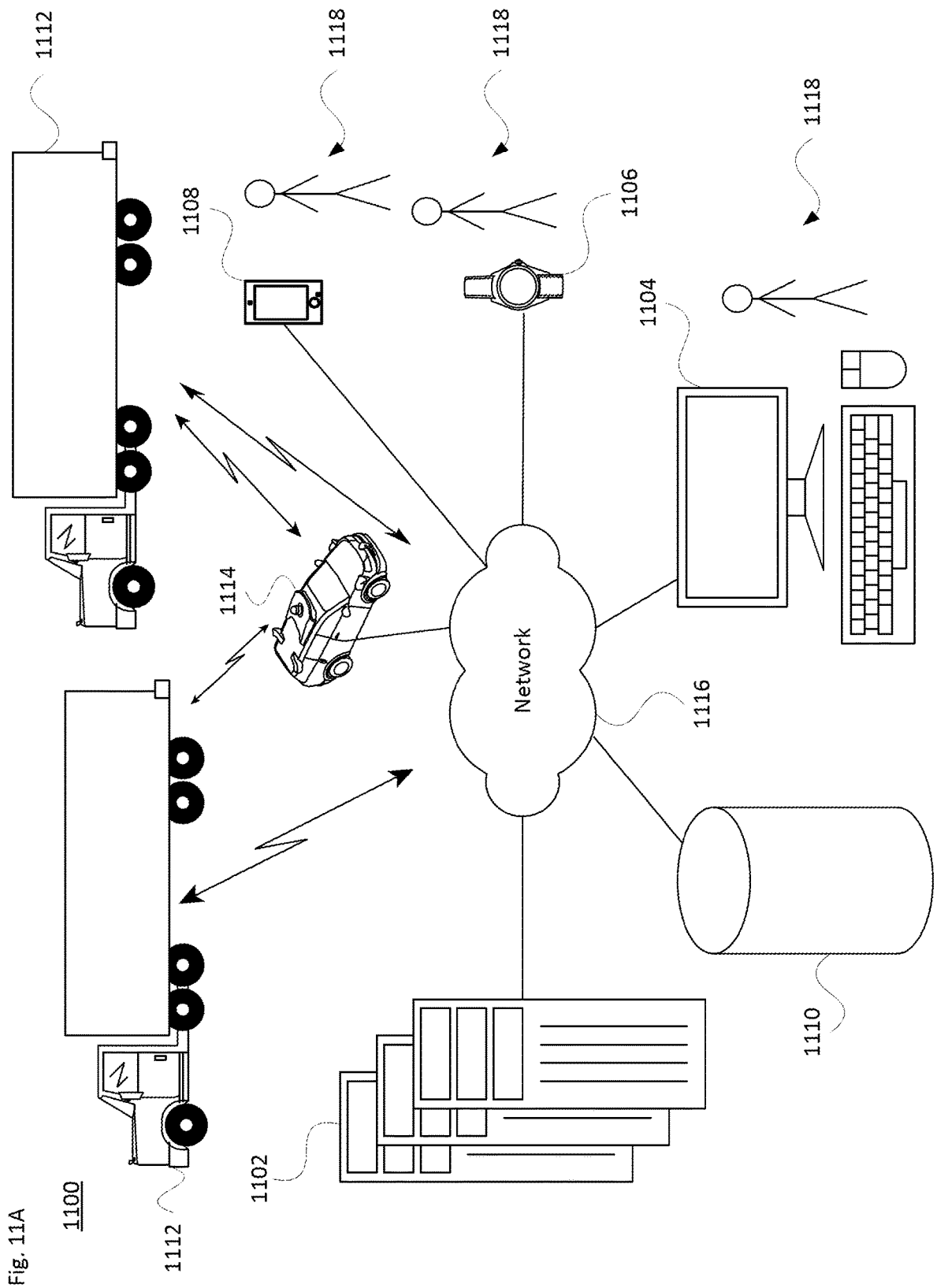

Fig. 11B 1150

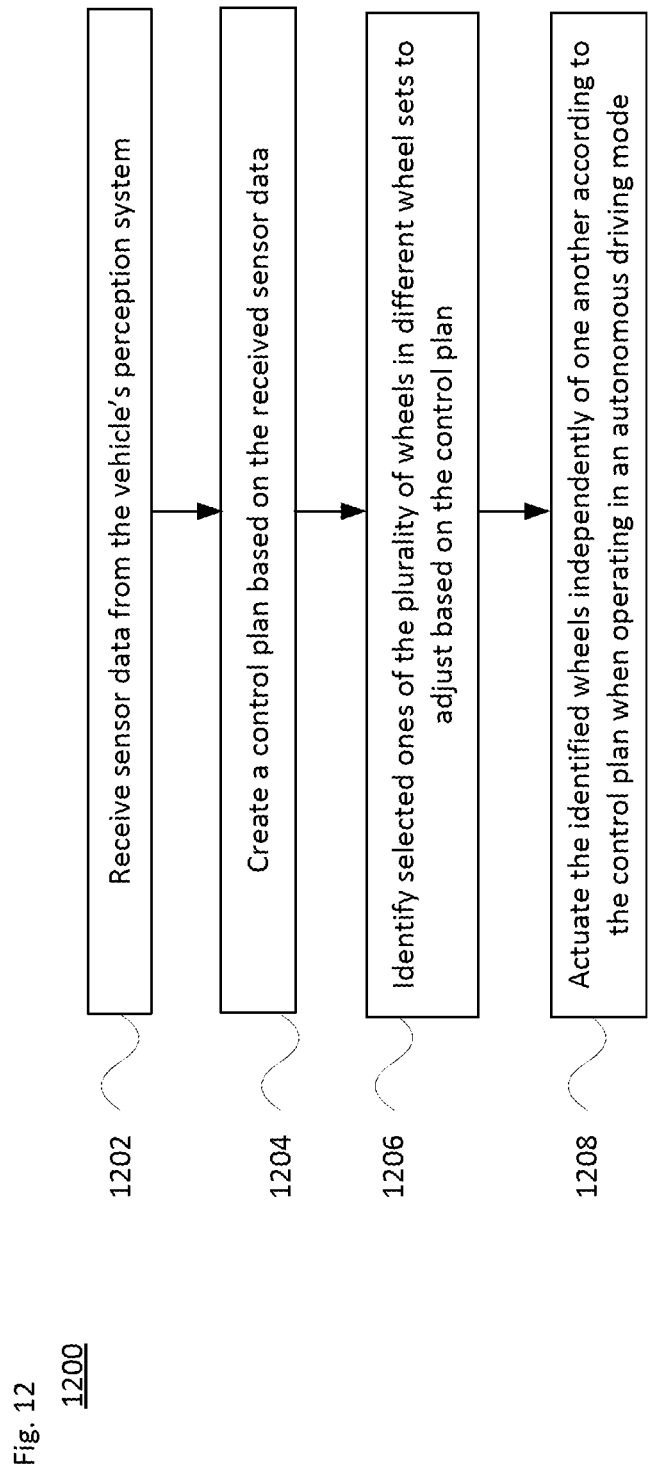

INDEPENDENTLY ACTUATED WHEEL SETS FOR LARGE AUTONOMOUS SELF-DRIVING VEHICLES

CROSS-REFERENCE TO RELATED APPLICATIONS

This present application is a continuation of U.S. patent application Ser. No. 16/863,450 filed Apr. 30, 2020, which claims the benefit of the filing date of U.S. Provisional Application No. 62/901,859, filed Sep. 18, 2019, the entire disclosures of which are incorporated herein by reference.

BACKGROUND

Autonomous vehicles, such as vehicles that do not require a human driver, can be used to aid in the transport of cargo or passengers from one location to another. Such vehicles may operate in a fully autonomous mode, or a partially autonomous mode where a person may provide some driving input. Large self-driving vehicles such as tractor-trailer trucks and other cargo vehicles, articulating buses, fire trucks and the like include multiple sets of wheels. Typically, only the front wheel set (e.g., of the truck's tractor) are able to turn. This gives such vehicles a large turning radius, which makes it challenging to maneuver into and out of tight locations, such as a loading dock or narrow street. Sensors may be used to help the autonomous vehicle detect nearby objects while driving. However, self-driving operations may be limited by the ability to turn in a desired direction given the vehicle's turning radius.

BRIEF SUMMARY

The technology relates to large autonomous vehicles that employ multiple sets of independently actuated wheels to optimize the turning radius, effectively negotiate curves, turns, clear objects of varying heights (e.g., curbs) and generally maneuver well in tight spaces. Each wheel or wheel set may turn a different amount under control of an on-board computer system. The on-board computer system employs received sensor data to detect objects and situations in the environment around the vehicle. A physical model of the self-driving vehicle, including height, length, width, pivot point and turning radius, can be used in conjunction with the sensor data for route planning and driving operations in accordance with the physical characteristics of the vehicle including the additional degrees of freedom provided by the independently actuated wheels.

According to one aspect of the technology, a vehicle is configured to operate in an autonomous driving mode. The vehicle has a driving system including a steering subsystem, an acceleration subsystem and a deceleration subsystem to control driving of the vehicle in the autonomous driving mode. It also has a plurality of wheels arranged in two or more wheel sets, where each wheel set is configured for independent actuation by the driving system relative to the other wheel sets. A perception system of the vehicle includes one or more sensors configured to detect objects in an environment surrounding the vehicle based on obtained sensor data, where each of the one or more sensors is positioned along the vehicle. The vehicle also includes a control system operatively connected to the driving system and the perception system. The control system has one or more computer processors configured to receive sensor data from the perception system, create a control plan based on the received sensor data, identify selected ones of the plurality of wheels in the two or more wheel sets to adjust based on the control plan, and actuate the identified wheels independently of one another according to the control plan when operating in the autonomous driving mode.

In one example, the vehicle is a cargo vehicle having a tractor and at least one trailer pivotally coupled to the tractor. In this case, the control plan includes changing a position or orientation of the at least one trailer unit relative to the tractor.

In another example, the control system is configured to cause the selected wheels in the two or more wheel sets to vary position to cause a lateral movement of the vehicle. Here, the control system may be configured to cause the selected wheels in the two or more wheel sets to vary position to provide braking or to avoid jackknifing of the vehicle.

In a further example, the control system is configured to cause the selected wheels in the two or more wheel sets to vary position to alter a pivoting axis the vehicle. In yet another example, the control system is configured to cause the selected wheels in the two or more wheel sets to vary position to reduce a blind spot of the perception system.

The control plan may include a maneuver selected from the group consisting of a parking maneuver, a turning maneuver, and a backing up maneuver.

In another example, the control system stores a model of the vehicle. In this case, the control system may be further configured to create the control plan based on the vehicle model. The control plan may be created to minimize a swept volume of the vehicle along a route in accordance with the vehicle model. Alternatively or in addition, the control plan may include adjusting a height of a portion of the vehicle to avoid an object detected by the perception system. The control plan may also be created to maintain a threshold distance from another vehicle in the environment.

According to another aspect, a method of controlling a vehicle configured to operate in an autonomous driving mode is provided. The vehicle includes a plurality of wheels arranged in two or more wheel sets, where each wheel set is configured for independent actuation relative to the other wheel sets. The method comprises receiving, by one or more processors of a control system of the vehicle, sensor data from a perception system of the vehicle; creating, by the one or more processors, a control plan based on the received sensor data; identifying, by the one or more processors, selected ones of the plurality of wheels in the two or more wheel sets to adjust based on the control plan; and actuating the identified wheels independently of one another according to the control plan when operating in the autonomous driving mode.

In one example, the vehicle is a cargo vehicle having a tractor and at least one trailer pivotally coupled to the tractor, and the control plan includes changing a position or orientation of the at least one trailer unit relative to the tractor.

In another example, actuating the identified wheels according to the control plan is to either alter a pivoting axis the vehicle, or reduce a blind spot of the perception system.

In a further example, the control plan includes a maneuver selected from the group consisting of a parking maneuver, a turning maneuver, and a backing up maneuver.

In yet another example, the control plan includes adjusting a height of a portion of the vehicle to avoid an object detected by the perception system. The control plan may be created to minimize a swept volume of the vehicle along a route in accordance with a stored vehicle model. Alternatively or in addition, the control plan may be created to maintain a threshold distance from another vehicle in an environment surrounding the vehicle.

And according to another aspect, a non-transitory computer-readable recording medium is provided with stored instructions. The instructions, when executed by one or more processors of a computer, cause the one or more processors to perform a method of controlling a vehicle configured to operate in an autonomous driving mode. The vehicle includes a plurality of wheels arranged in two or more wheel sets, where each wheel set is configured for independent actuation relative to the other wheel sets. The method comprises receiving sensor data from a perception system of the vehicle; creating a control plan based on the received sensor data; identifying selected ones of the plurality of wheels in the two or more wheel sets to adjust based on the control plan; and actuating the identified wheels independently of one another according to the control plan when operating in the autonomous driving mode.

BRIEF DESCRIPTION OF THE DRAWINGS

FIGS. 1A-B illustrate an example cargo-type vehicle configured for use with aspects of the technology.

FIG. 5 illustrates examples of object height variation in accordance with aspects of the technology.

FIGS. 11A-B illustrates an example system in accordance with aspects of the technology.

FIG. 12 illustrates an example method in accordance with aspects of the technology.

DETAILED DESCRIPTION

Figure 2A:
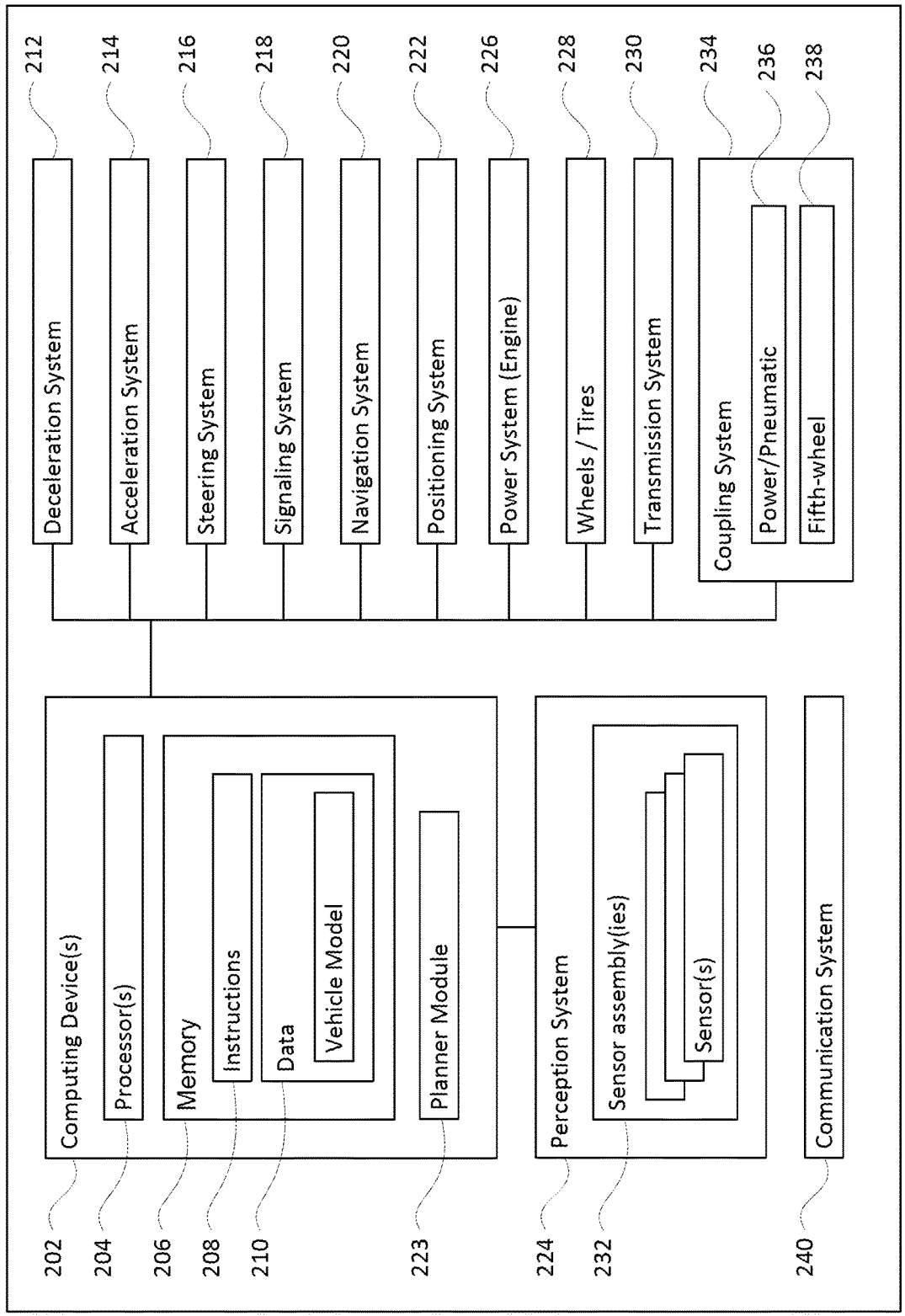
FIGS. 2A-B are block diagrams of systems of an example cargo-type vehicle in accordance with aspects of the technology.

Features of the technology involve maneuvering a large self-driving vehicle by adjusting multiple wheels or wheel sets independently of one another, for instance to achieve a minimum turning radius or otherwise modify driving operations to avoid nearby objects. This can include making turns, moving into or out of parking spaces, driving along narrow or congested roads, etc. The vehicle's on-board computer system can take real-time corrective action or modify a planned route in accordance with the capabilities afforded by the independently actuated wheels. The technology is beneficial in different types of environments. For instance, fine wheel control can allow the on-board control system to plan an efficient route or specific maneuvers in residential neighborhoods, construction zones, loading docks, etc.

Example Vehicle Systems

FIGS. 1A-B illustrate an example cargo vehicle 100, such as a tractor-trailer truck. FIG. 1A is a side view and FIG. 1B is a top-down view. The truck may include, e.g., a single, double or triple trailer, or may be another medium or heavy duty truck such as in commercial weight classes 4 through 8. As shown, the truck includes a tractor unit 102 and a single cargo unit or trailer 104. The trailer 104 may be fully enclosed, open such as a flat bed, or partially open depending on the type of cargo to be transported. In this example, the tractor unit 102 includes the engine and steering systems (not shown) and a cab 106 for a driver and any passengers. In a fully autonomous arrangement, the cab 106 may not be equipped with seats or manual driving components, since no person may be necessary.

The trailer 104 includes a hitching point, known as a kingpin, 108. The kingpin 108 is typically formed as a solid steel shaft, which is configured to pivotally attach to the tractor unit 102. In particular, the kingpin 108 attaches to a trailer coupling 110, known as a fifth-wheel, that is mounted rearward of the cab 106. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor and/or trailer may have one or more sensor units 112, 114 and 116 disposed therealong. For instance, one or more sensor units 112 may be disposed on a roof or top portion of the cab 106, and one or more side sensor units 114 may be disposed, e.g., on left and/or right sides of the cab 106. In some cases, such sensor units may be located on the top of, on the bottom of, adjacent to, or in place of rear-view mirrors. Sensor units may also be located along other regions of the cab 106, such as along the front bumper or hood area, in the rear of the cab adjacent to the fifth-wheel, underneath the chassis, etc. The trailer 104 may also have one or more sensor units 116 disposed therealong, for instance along a side panel, front, rear, roof and/or undercarriage of the trailer 104.

By way of example, each sensor unit may include one or more sensors, such as lidar, radar, camera (e.g., optical or infrared), acoustical (e.g., microphone or sonar-type sensor), pressure (e.g., piezoelectric or mechanical), inertial (e.g., accelerometer, gyroscope, etc.) or other sensors (e.g., positioning sensors such as GPS sensors). Acoustical sensors near the tires (e.g., on the vehicle chassis near the axles or wheel wells) can detect the sounds of the tires as the vehicle drives autonomously along the roadway. A change in sound may indicate a different road surface type, a flat or underpressurized tire or other circumstance. Pressure sensors could be used to detect instantaneous tire pressure or the weight distribution of cargo. While certain aspects of the disclosure may be particularly useful in connection with specific types of vehicles, the vehicle may be any type of vehicle including, but not limited to, trucks and other cargo vehicles, buses, cars, motorcycles, recreational vehicles, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode can include both partial and full autonomy.

FIG. 2A illustrates a block diagram 200 with various components and systems of an exemplary vehicle, such as cargo vehicle 100, to operate in an autonomous driving mode. As shown, the block diagram 200 includes a control system having one or more computing devices 202. The control system may constitute an electronic control unit (ECU) of a tractor unit of the cargo vehicle 100. The computing devices 202 contain one or more processors 204, memory 206 and other components typically present in general purpose computing devices. The memory 206 stores information accessible by the one or more processors 204, including instructions 208 and data 210 that may be executed or otherwise used by the processor(s) 204. For instance, the data 210 may include a model of the vehicle, such as a kinematic model for both the tractor and trailer(s). The computing system is able to control overall operation of the vehicle when operating in an autonomous driving mode according to the vehicle model.

The memory 206 stores information accessible by the processors 204, including instructions 208 and data 210 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics, detected sensor data, per-vehicle calibration parameters and/or per-trailer calibration parameters, which may be on board the vehicle or remote, depending on the implementation.

The processors 204 may be commercially available CPUs. Alternatively, each processor may be a dedicated device such as an ASIC or other hardware-based processor. Although FIG. 2A functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may capable of communicating with various components of the vehicle. For example, the computing devices 202 may be in communication with various systems of the vehicle, such as a driving system including a deceleration system 212 (for controlling braking of the vehicle), acceleration system 214 (for controlling acceleration of the vehicle), steering system 216 (for controlling the orientation of the wheels or wheel sets and the direction of the vehicle), signaling system 218 (for controlling turn signals), navigation system 220 (for navigating the vehicle to a location or around objects) and a positioning system 222 (for determining the position of the vehicle, e.g., including the vehicle's pose). The autonomous driving computing system may employ a planner module 223, in accordance with the navigation system 220, the positioning system 222 and/or other components of the system, e.g., for determining a route from a starting point to a destination, for selecting an intermediate section of the route, or for making modifications to various driving aspects in view of current or expected conditions or situations along the route in view of the maneuvering capabilities of the vehicle.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230. Each wheel or wheel set may be separately adjustable. This may include control over the turning angle, toe angle, camber angle, relative height, etc. of the given wheel(s). The computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from map information and the navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the individual wheels or wheel sets of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes one or more sensor assemblies 232 for detecting objects external to the vehicle. The detected objects may be other vehicles, obstacles in the roadway, traffic signals, signs, trees, etc. By way of example only, the sensor assemblies 232 of the perception system 224 may each include one or more light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, acoustical sensors (e.g., microphones or sonar transducers), and/or any other detection devices that record data which may be processed by computing devices 202. Such sensors of the perception system 224 may detect objects outside of the vehicle and their characteristics such as location, orientation, size, shape, type (for instance, vehicle, pedestrian, bicyclist, etc.), heading, speed of movement relative to the vehicle, etc. In addition, the sensors may detect road conditions, like standing water, ice, or potholes, as well as the positions and orientations (pose) of different parts of the vehicle.

The perception system 224 may also include other sensors within the vehicle to detect objects and conditions within the vehicle, such as in the trailer or passenger compartment. For instance, such sensors may detect, e.g., cargo, passengers, pets, etc., as well as conditions within the vehicle or a component thereof, and/or outside the vehicle such as temperature, humidity, etc. Still further, sensors of the perception system 224 may measure the rate of rotation of the wheels 228, an amount or a type of braking by the deceleration system 312, pressure, alignment and other factors associated with the equipment of the vehicle itself. Depending on the vehicle configuration, the longitudinal position of the kingpin of the tractor may be adjustable. One or more sensors may be arranged to detect the specific longitudinal position of the kingpin.

The raw data from the sensors and the aforementioned characteristics can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module 223. In addition, the computing devices 202 may perform calibration of individual sensors, all sensors in a particular sensor assembly, or between sensors in different sensor assemblies or other physical housings.

As noted above, one or more sensors of the perception system 224 may be incorporated into sensor assemblies or housings. In one example, these may be integrated into the side-view mirrors on the vehicle, e.g., as sensor towers integrated into the side-view mirrors on the truck, farm equipment, construction equipment or the like. In another example, other sensors may be part of the roof-top housing 112, or other sensor housings or units 114 and/or 116. The computing devices 202 may communicate with the sensor assemblies located on or otherwise distributed along the vehicle. Sensor assemblies 232 may also be positioned at different locations on the tractor unit 102 or on the trailer 104, as noted above with regard to FIGS. 1A-B. The computing devices 202 may communicate with the sensor assemblies located on both the tractor unit 102 and the trailer 104. Each assembly may have one or more types of sensors such as those described above.

Also shown in FIG. 2A is a coupling system 234 for connectivity between the tractor unit and the trailer. The coupling system 234 may include one or more power and/or pneumatic connections 236 and a fifth-wheel 238 at the tractor unit for connection to the kingpin of the trailer.

A communication system 240 is also shown as part of vehicle system 200. For instance, the communication system 240 may also include one or more wireless configurations to facilitate communication with other computing devices, such as passenger computing devices within the vehicle, computing devices external to the vehicle such as in another nearby vehicle on the roadway, and/or a remote server system. Such connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 2B:
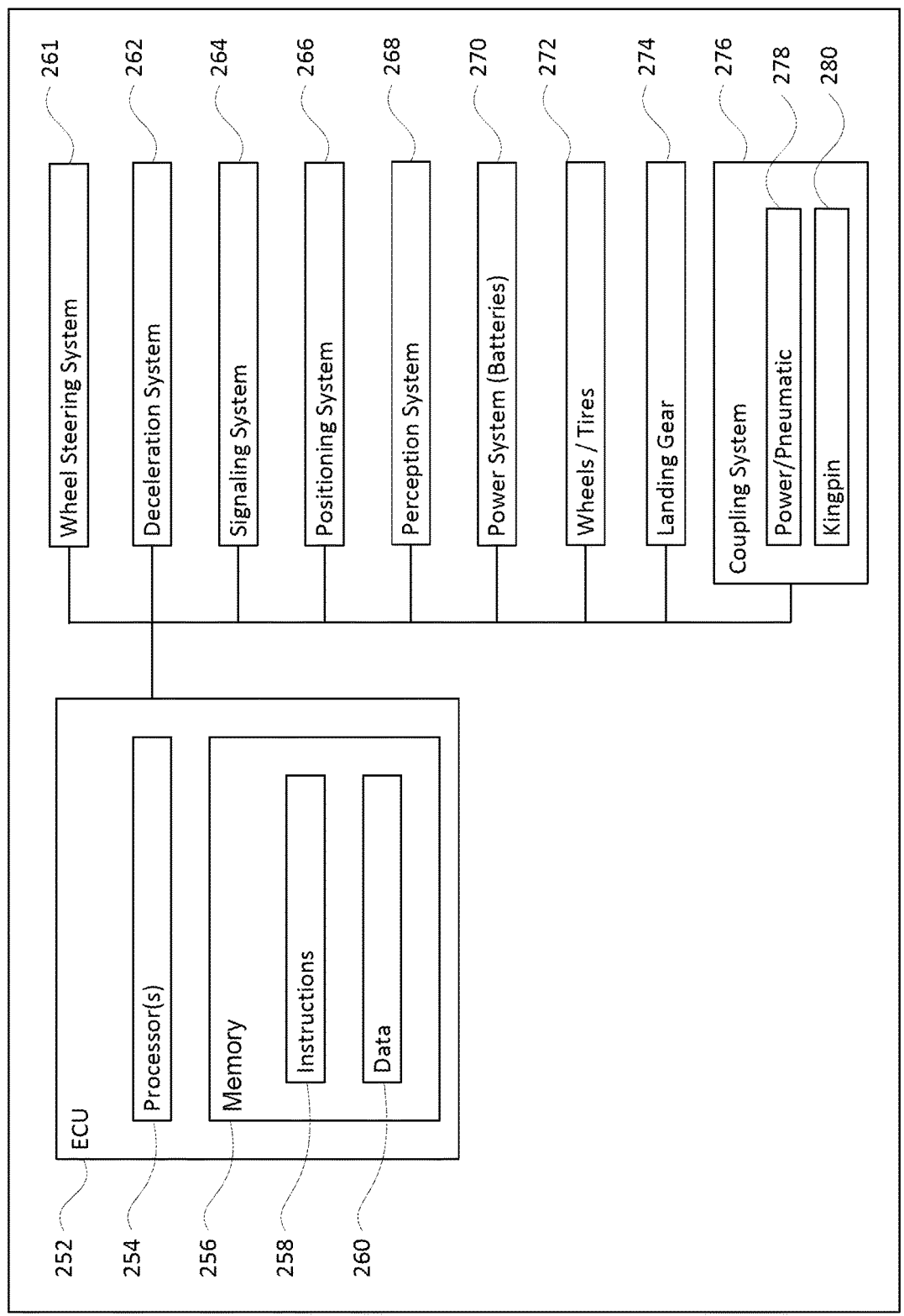

FIG. 2B illustrates an example block diagram 250 of trailer-based subsystems, such as might be included in trailer 104 of FIGS. 1A-B. As shown, the system includes an ECU 252 of one or more computing devices, such as computing devices containing one or more processors 254, memory 256 and other components typically present in general purpose computing devices. The memory 256 stores information accessible by the one or more processors 254, including instructions 258 and data 260 that may be executed or otherwise used by the processor(s) 254. The descriptions of the processors, memory, instructions and data from FIG. 2A apply to these elements of FIG. 2B.

The ECU 252 is configured to receive information and control signals from the trailer unit. The on-board processors 254 of the ECU 252 may communicate with various systems of the trailer, including a wheel steering system 261, a deceleration system 262, signaling system 264, and a positioning system 266. The ECU 252 may also be operatively coupled to a perception system 268 with one or more sensors for detecting objects in the trailer's environment and a power system 270 (for example, a battery power supply) to provide power to local components. Some or all of the wheels/tires 272 of the trailer may be independently coupled to the wheel steering system 261 and the deceleration system 262. The processors 254 may be able to receive information about tire pressure, balance, temperature, wheel speed and other factors that may impact driving in an autonomous mode, and to relay that information to the processing system of the tractor unit. The steering system 261, deceleration system 262, signaling system 264, positioning system 266, perception system 268, power system 270 and wheels/tires 272 may operate in a manner such as described above with regard to the subsystems of FIG. 2A.

The trailer also includes a set of landing gear 274 as well as a coupling system 276. The landing gear provide a support structure for the trailer when decoupled from the tractor unit. The coupling system 276, which may be a part of coupling system 234, provides connectivity between the trailer and the tractor unit. Thus, the coupling system 276 may include a connection section 278 (e.g., for power and/or pneumatic links). As shown, the coupling system 276 also includes a kingpin 280 configured for connectivity with the fifth-wheel of the tractor unit.

Example Implementations

In view of the structures and configurations described above and illustrated in the figures, various aspects will now be described in accordance with aspects of the technology.

As noted above, various sensors may be located at different places around the vehicle (see FIGS. 1A-B) to gather data from different parts of the external environment and/or the vehicle itself. Certain sensors may have different fields of view (FOV) of the external environment and/or parts of the vehicle depending on their placement around the vehicle and the type of information they are designed to gather. For instance, different lidar sensors may be used for near (short range) detection of objects adjacent to the vehicle (e.g., less than 2-10 meters), while others may be used for far (long range) detection of objects a hundred meters (or more or less) in front of the vehicle. Mid-range lidars may also be employed. Multiple radar units may be positioned toward the front or rear of the vehicle for long-range object detection. And cameras may be arranged to provide good visibility around the vehicle. Depending on the configuration, certain types of sensors may include multiple individual sensors with overlapping fields of view. Alternatively or additionally, other sensors may provide redundant 360° fields of view. In addition to detecting objects in the environment external to the vehicle, these sensors may be used to determine the vehicle's actual pose including, e.g., the orientation of the trailer to the tractor unit of a cargo vehicle.

Figure 3:
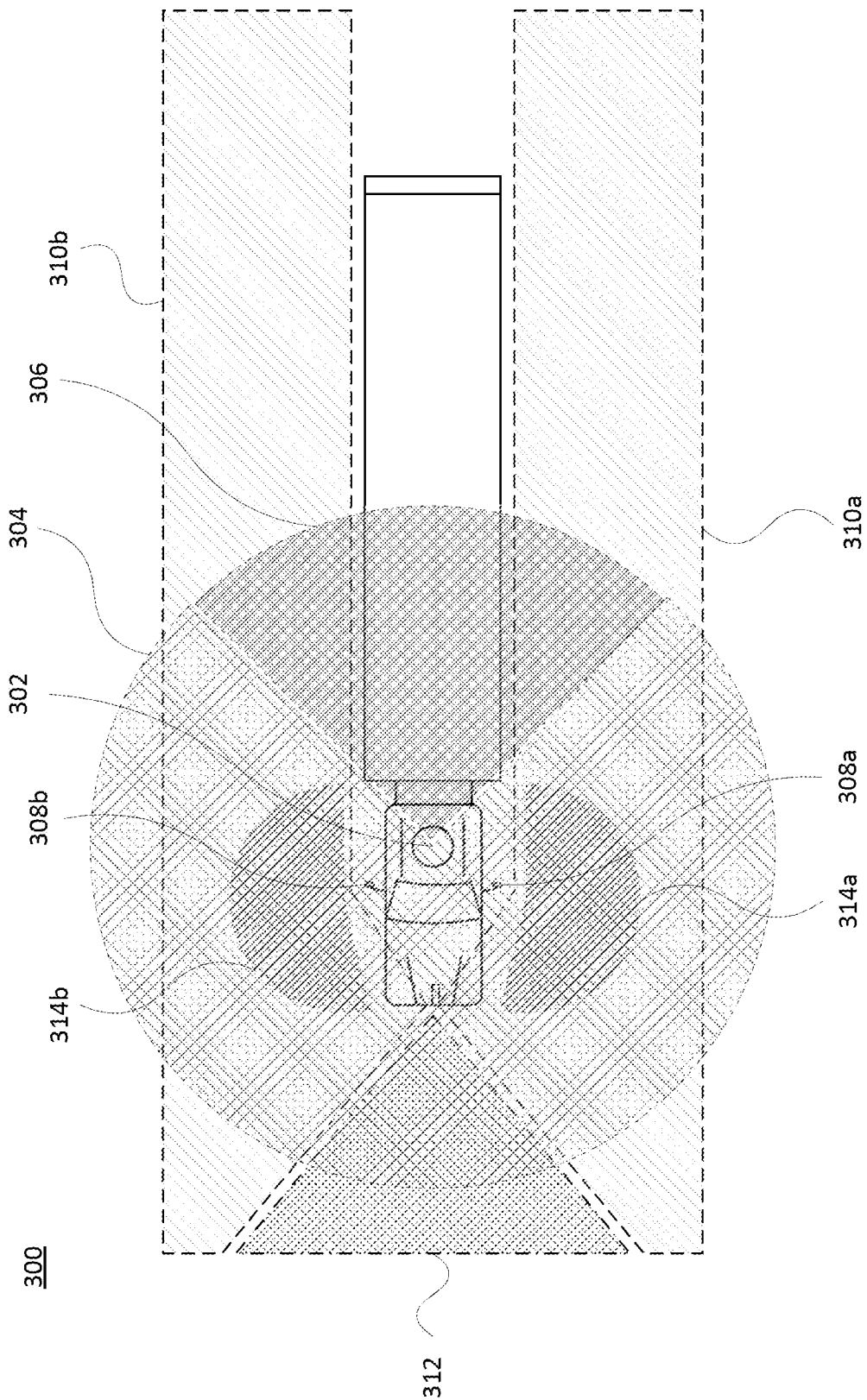
FIG. 3 illustrates example sensor fields of view for a cargo-type vehicle in accordance with aspects of the disclosure.

FIG. 3 provides one example 300 of sensor fields of view relating to the sensors, such as those illustrated in FIG. 1B. As illustrated in example 300 of FIG. 3, the lidar(s) in the rooftop sensor housing 302 may have a FOV 304. Here, as shown by region 306, the trailer or other articulating portion of the vehicle may provide signal returns, and may partially or fully block a rearward view of the external environment. Long range lidars of left and right side sensor units 308a, 308b of the tractor unit have FOVs 310a and 310b. These can encompass significant areas along the sides and front of the vehicle. As shown, there may be an overlap region 312 of their fields of view in front of the vehicle. The overlap region 312 provides the perception system with additional or information about a very important region that is directly in front of the tractor unit. This redundancy also has a safety aspect. Should one of the long range lidar sensors suffer degradation in performance, the redundancy would still allow for operation in an autonomous mode. Short range lidars of the sensor units 308a and 308b have smaller FOVs 314a and 314b. Both the long range and short range lidars may be co-located in a single housing 308a or 308b as shown, or may be disposed separately on the vehicle. A space is shown between different fields of view for clarity in the drawing; however, in actuality there may be no break in the coverage. The specific placements of the sensor assemblies and fields of view is merely exemplary, and may differ depending on, e.g., the type of vehicle, the size of the vehicle, FOV requirements, etc.

Figure 4:
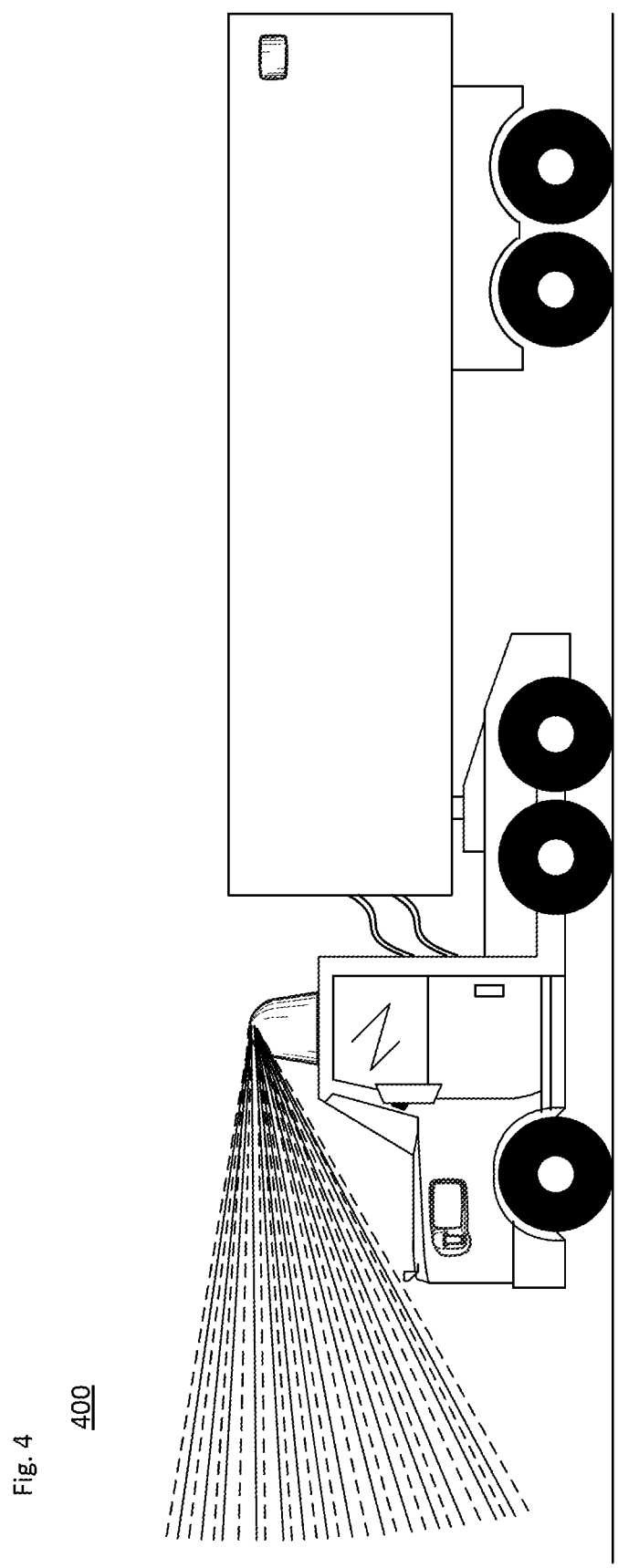
FIG. 4 illustrates an example sensor scan operation in accordance with aspects of the technology.

These and other sensors are able to detect not only the location of objects in the environment, but also their height and other information as well. This may be done by making multiple scans of the environment by one or more sensors. By way of example, FIG. 4 illustrates a vehicle using sensor assembly to scan for objects in the environment. The sensor assembly may be, e.g., rooftop sensor housing 302 of FIG. 3. The sensor assembly may include one or more lidar, radar, camera or other sensors therein. Solid and dashed lines emanating from the housing indicate examples of individual scans of the environment. For instance, 10 (or more or less) individual scans may be made by a given sensor per scan period. This may include adjusting the sensor's FOV up or down, left or right, e.g., with a motor, servo or other actuator. The individual scans may be selected to cover particular portions of the sensor's FOV or selected regions around the vehicle.

Based on this information, as shown by example 500 of FIG. 5, the on-board control system may detect objects of different size, shape and height, such as a passenger vehicle 502, bicycle 504, streetlight 506 and street sign 508, no-parking sign 510, business signage (e.g., barber pole) 512, construction signage 514, mailbox 516, curb 518, etc. The information about the locations and different heights of such objects can be used in accordance with the vehicle model to plan how to orient the wheel sets in order to achieve a particular driving operation or other maneuver. For instance, the trailer may have clearance over the curb 518 to make a tight turn around a corner; however, sign 510 or streetlight 506 may be located so that some maneuvers would cause the side or roof of the trailer to intersect with those object. Thus, a different maneuver may be planned to avoid such obstacles.

Example Scenarios

As noted above, aspects of the technology involve independently actuating different sets of wheels on the vehicle in order to enhance its maneuverability. Information about such actuation capabilities and a model of the vehicle may also be employed when modifying or re-plan an upcoming portion of a route to a given destination. For instance, the perception system of the tractor unit and/or trailer can be used to detect both objects in the environment as well as the vehicle's actual pose at the particular point in time along the region of the roadway. The vehicle's control system may use this information in accordance with the vehicle model to actuate various wheels or wheel sets in specific orientations or patterns to perform specific maneuvers. Examples of maneuvers in specific scenarios are discussed below.

Figure 6A:
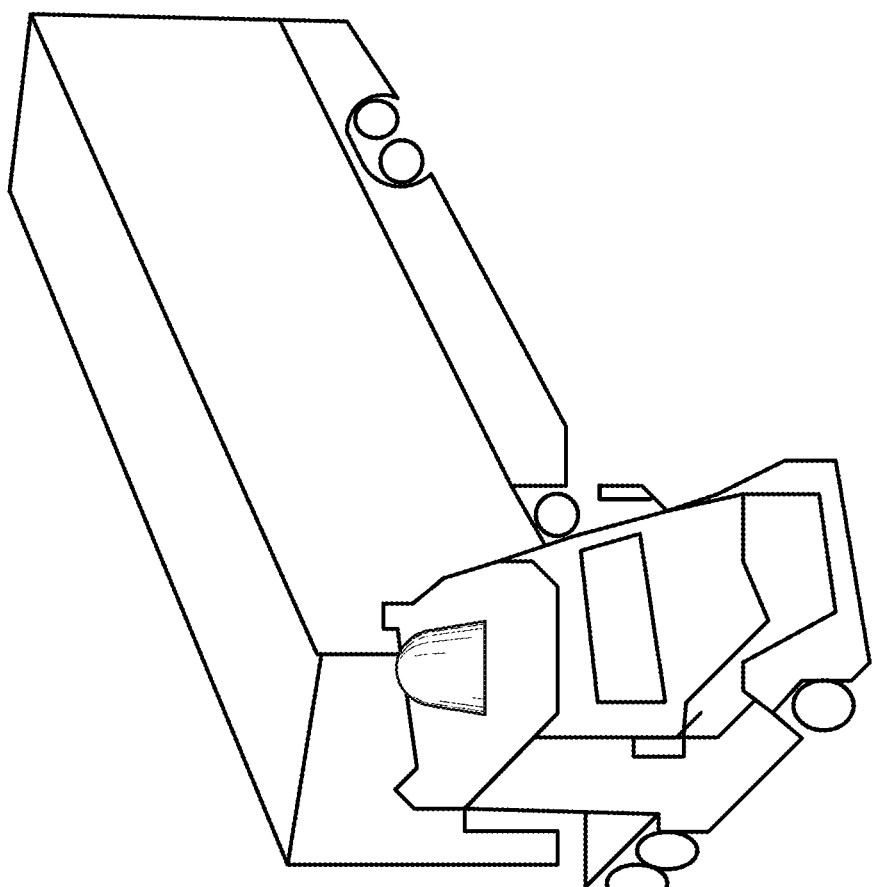
FIGS. 6A-B illustrate an example scenario for reducing the risk of jackknifing in accordance with aspects of the technology.
Figure 6B:
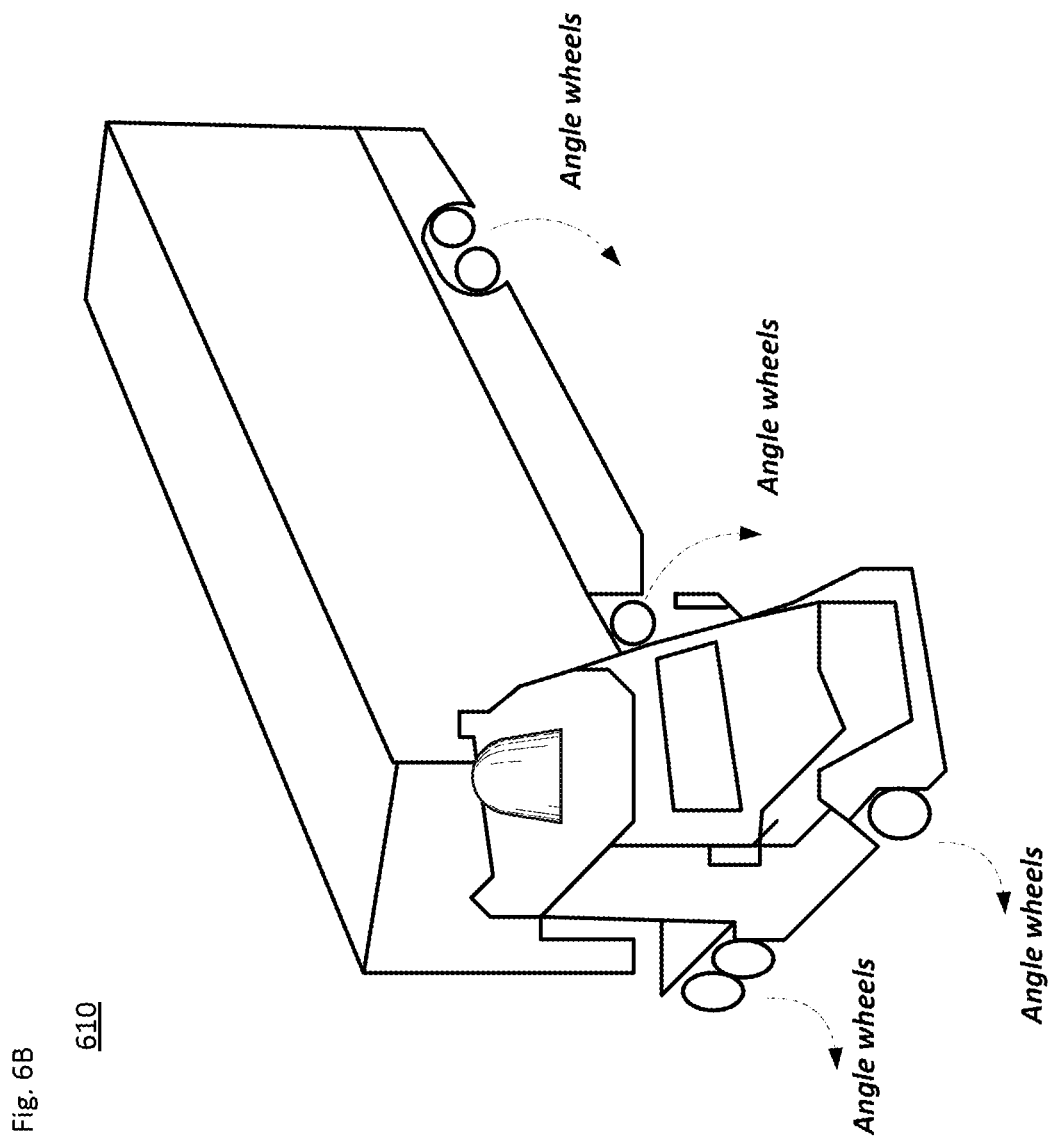

FIGS. 6A-B illustrate a jackknifing-avoidance scenario. As shown in 600 of FIG. 6A, the truck may make a sharp turn, for instance to avoid an object on the freeway or a surface street. If only the front wheels of the tractor are able to turn, a sharp turn can cause the truck to jackknife. However, as shown in 610 of FIG. 6B, different wheel sets may be independently angled to cause the tractor and trailer to straighten out relative to one another. For instance, wheels of the tractor and the trailer may be angled, for instance by turning in the same direction by the same or different amounts.

Figure 7A:
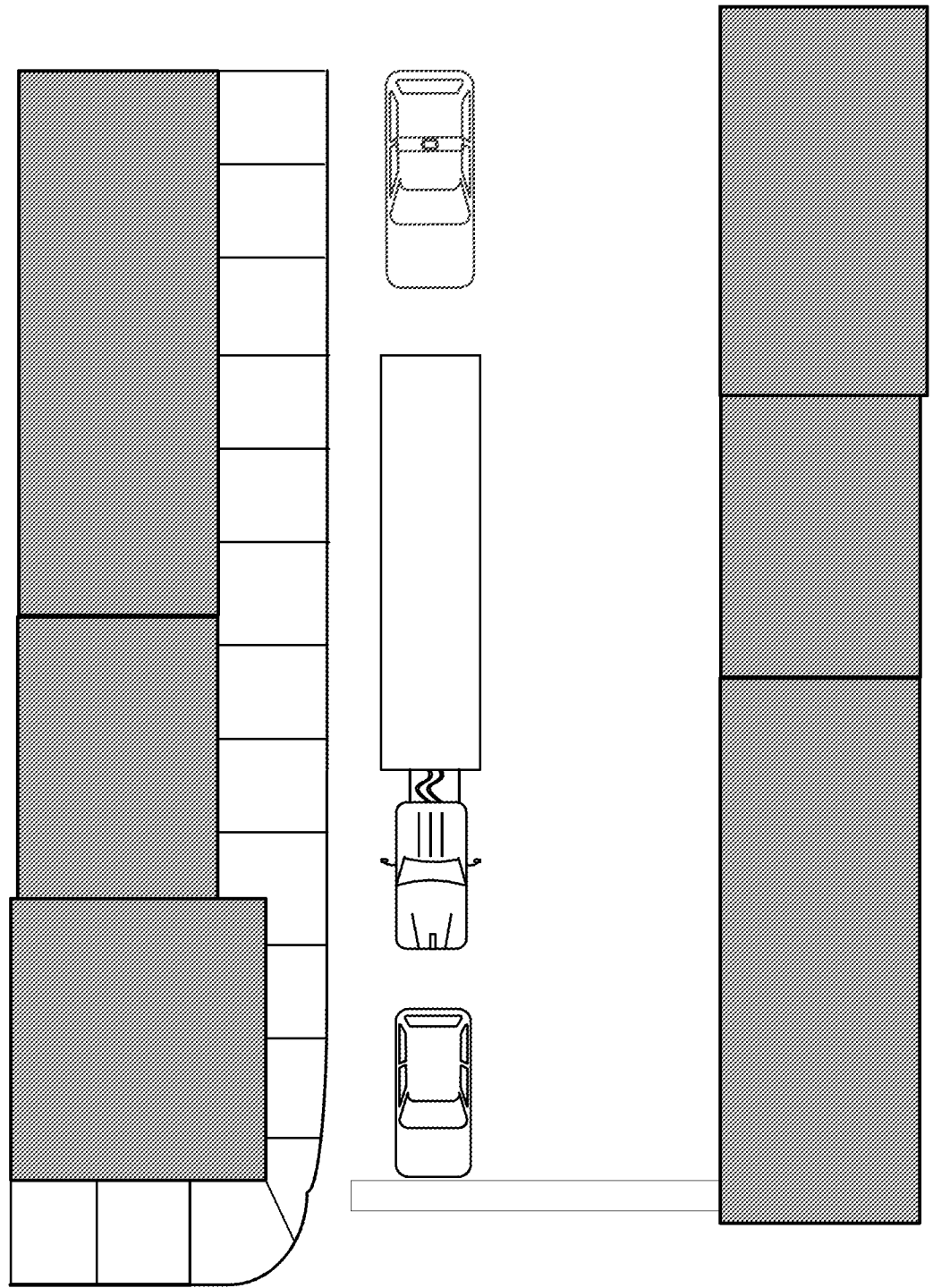
FIGS. 7A-D illustrate a parked scenario in accordance with aspects of the technology.
Figure 7B:
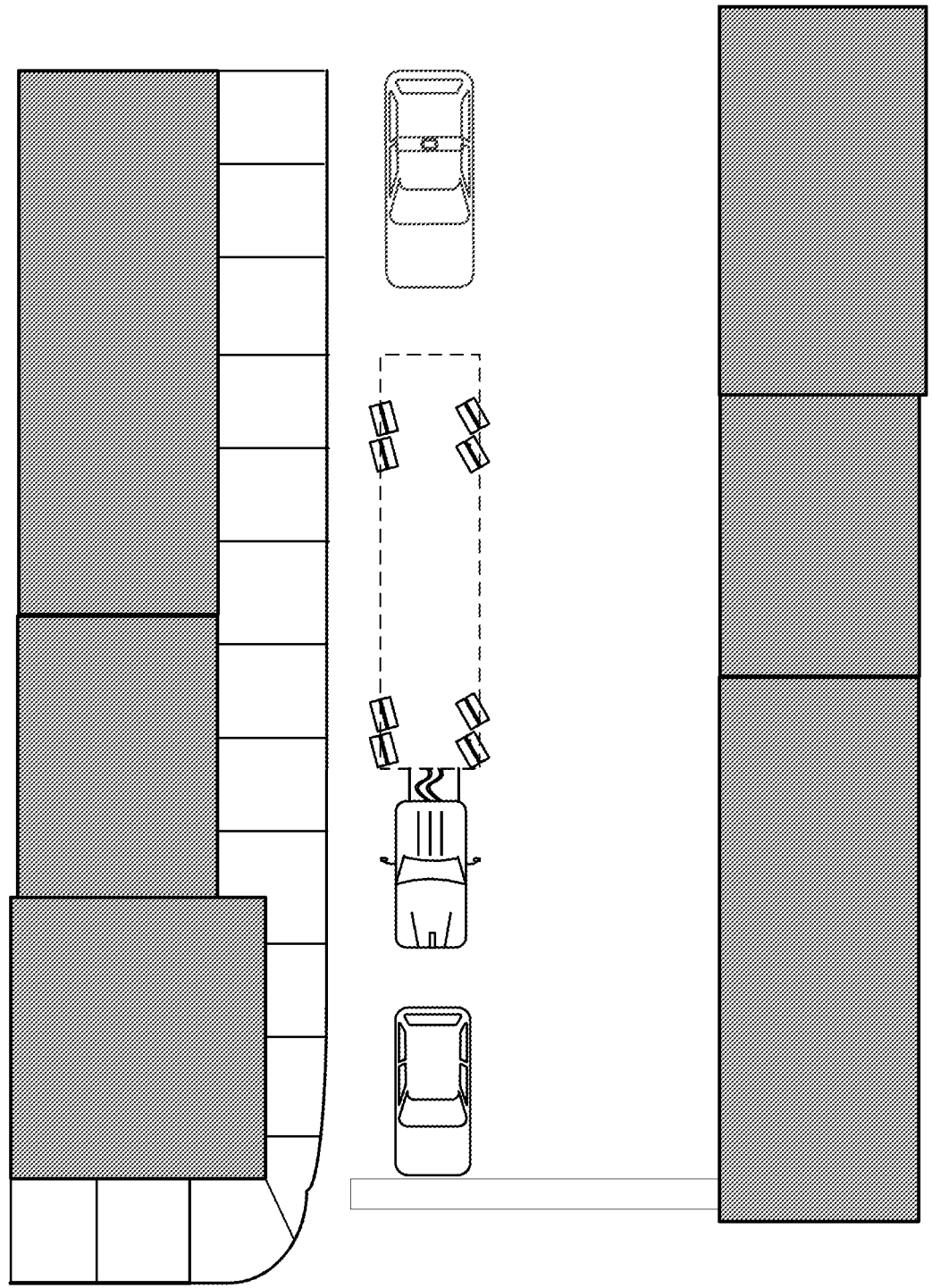
Figure 7C:
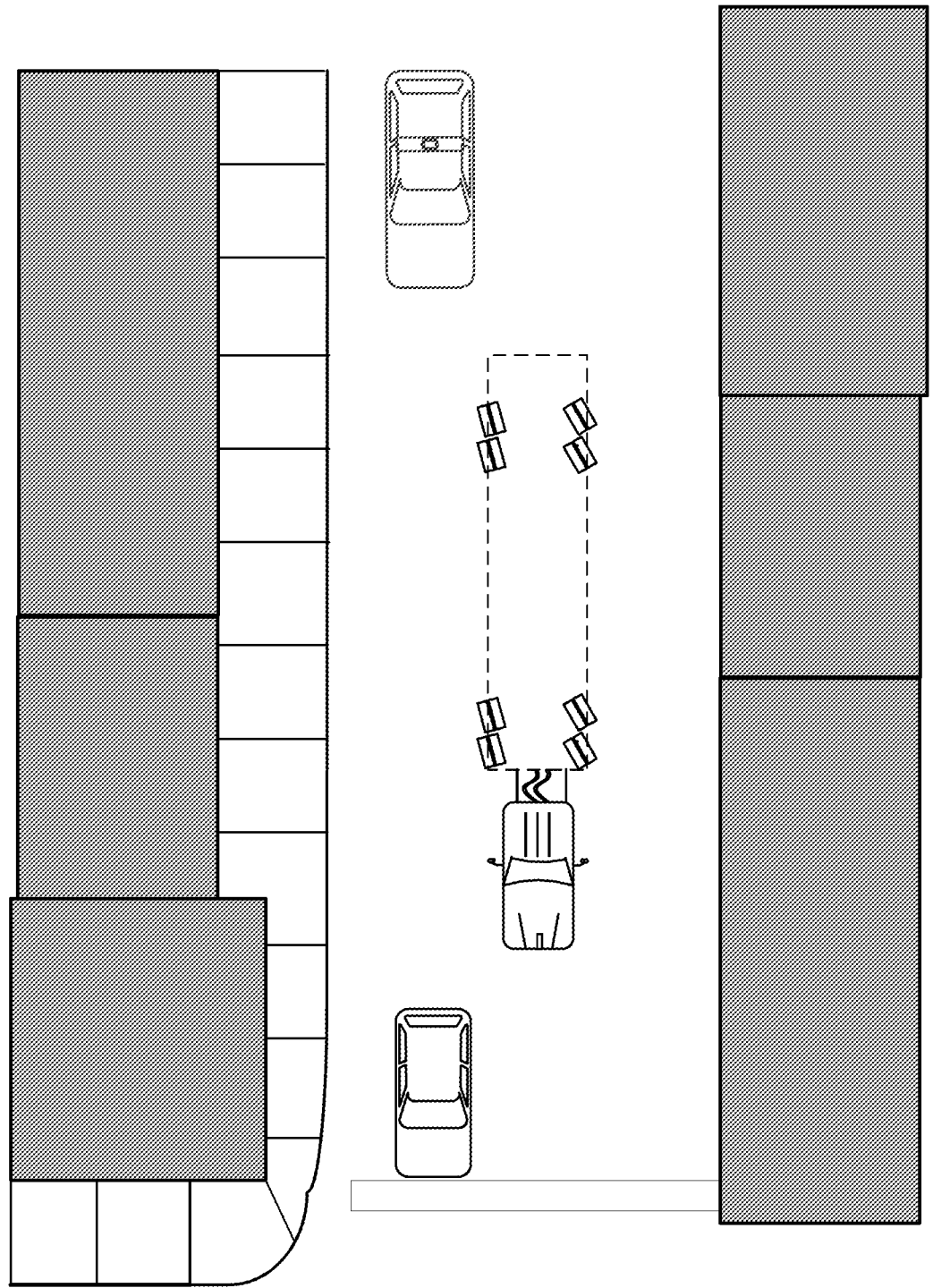
Figure 7D:
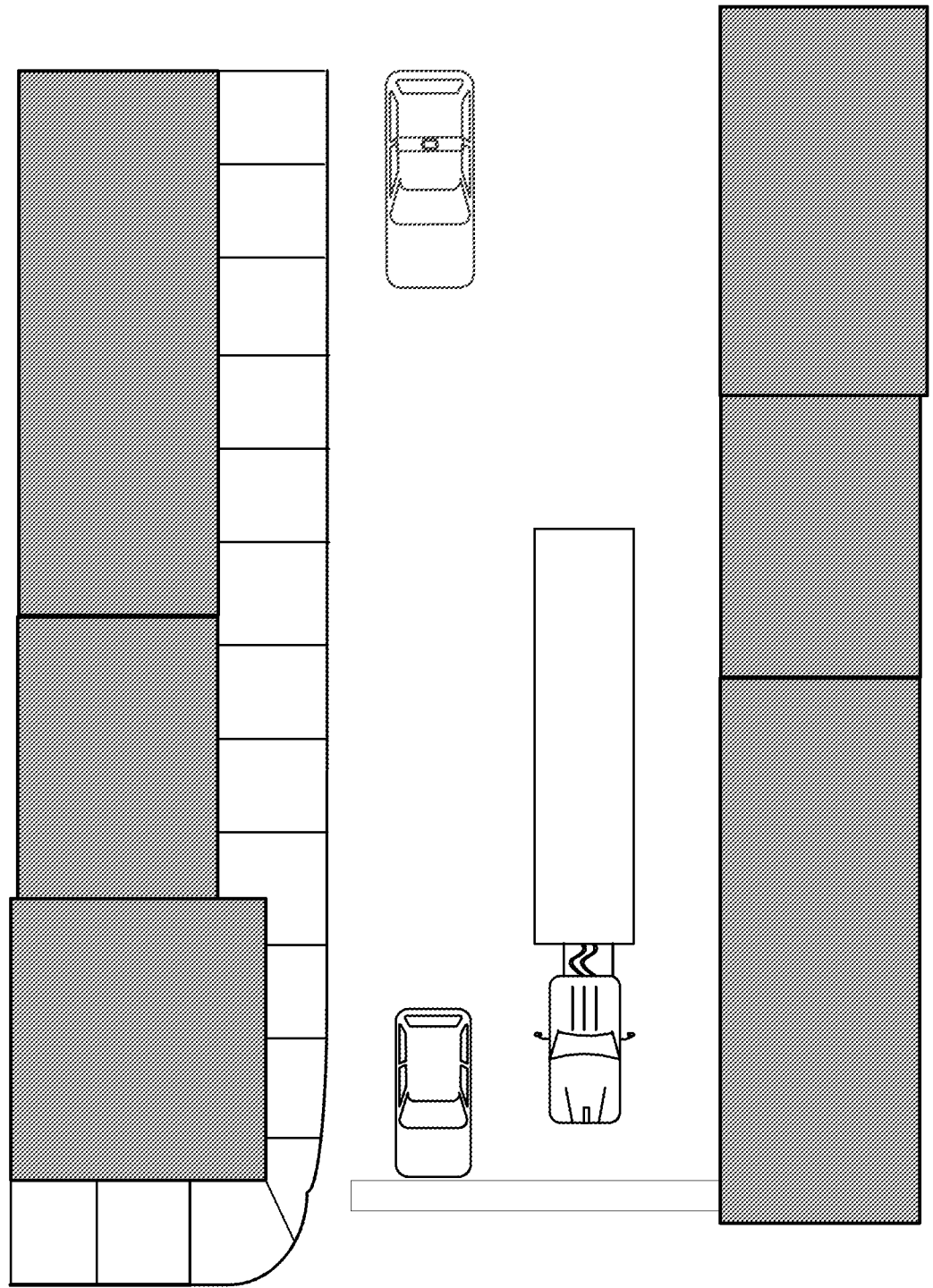

FIGS. 7A-D illustrate a scenario involving maneuvering out of a tight space, such as with on-street parking in a city environment. As shown in view 700 of FIG. 7A, a large vehicle such as a tractor-trailer is parked with vehicles both in front and behind. As shown in view 710 of FIG. 7B, which presents a partial see-through view of the trailer, some or all of the trailer and tractor wheel sets may be adjusted, e.g., via control of the steering and transmission subsystems. Depending on the vehicle capabilities, in one example rotation of the wheels enables the vehicle to pull out of the parking spot. In another example, multiple wheel sets may be pivoted, such as in a toe-in, toe-out pattern, to "walk" the vehicle laterally out of the parking spot. View 730 of FIG. 7C illustrates the vehicle pulling out of the parking spot, and once the vehicle has pulled out, view 740 of FIG. 7D illustrates the vehicle driving away.

Figure 8A:
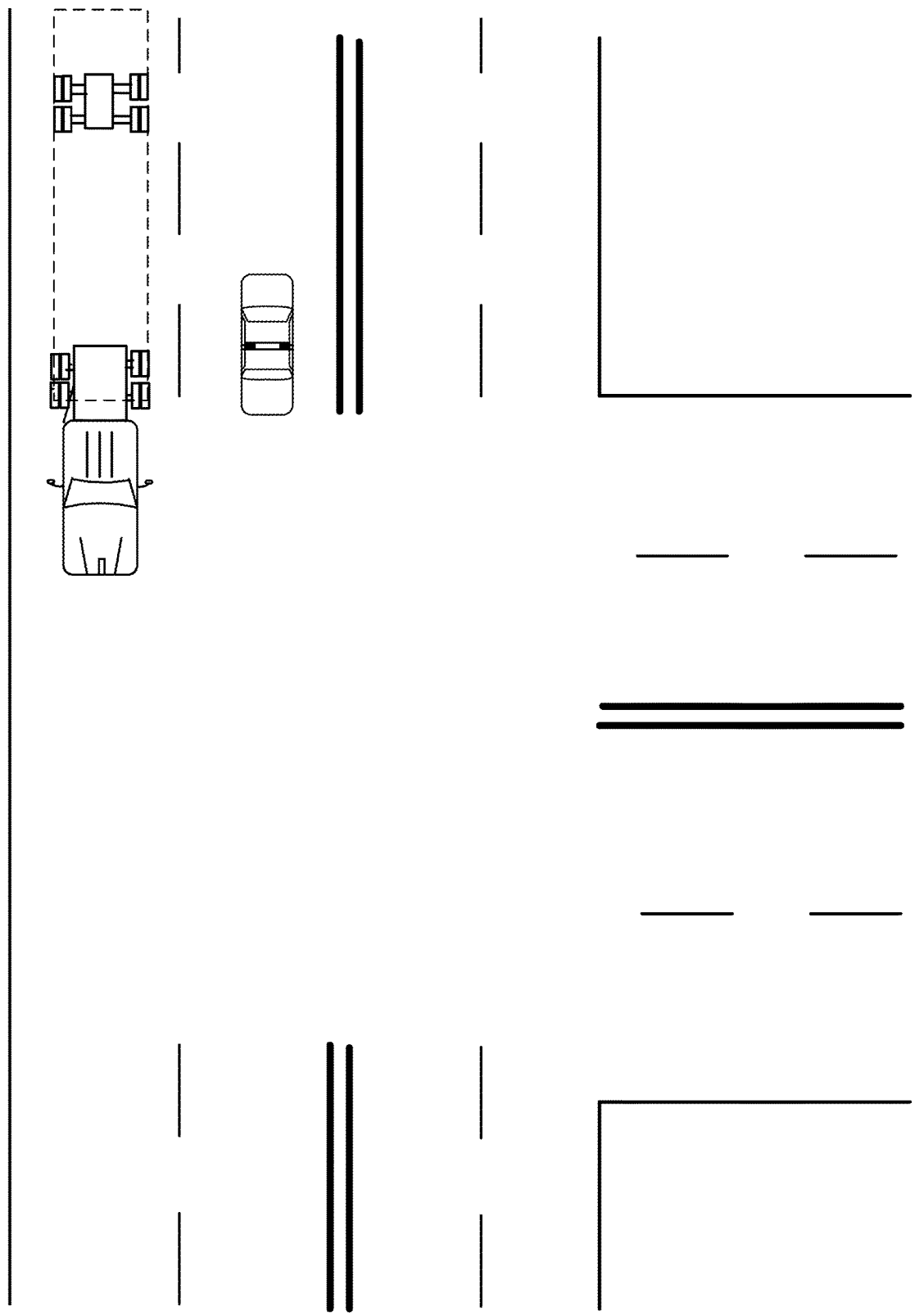
FIGS. 8A-C illustrate a turning scenario in accordance with aspects of the technology.
Figure 8B:
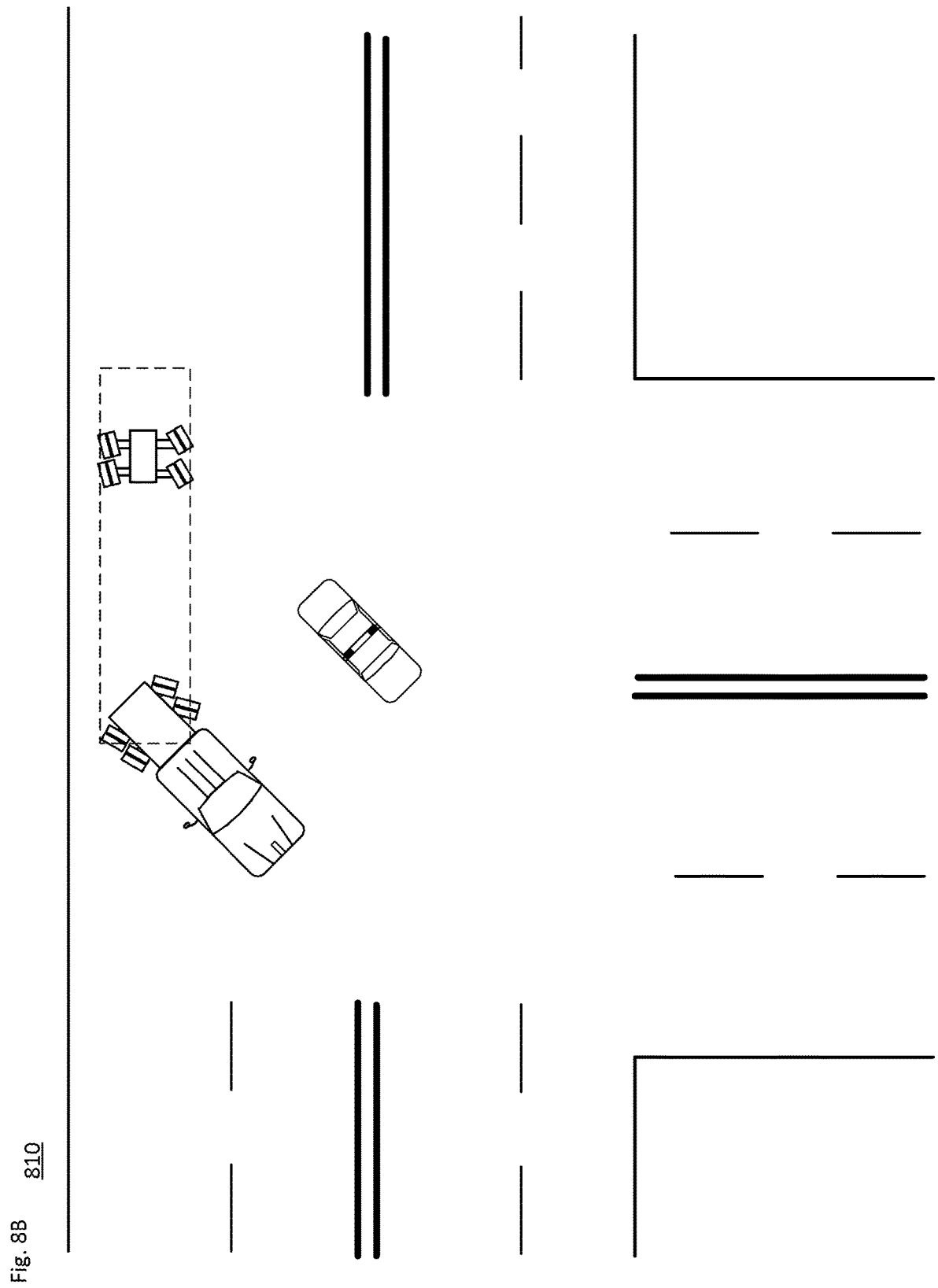
Figure 8C:
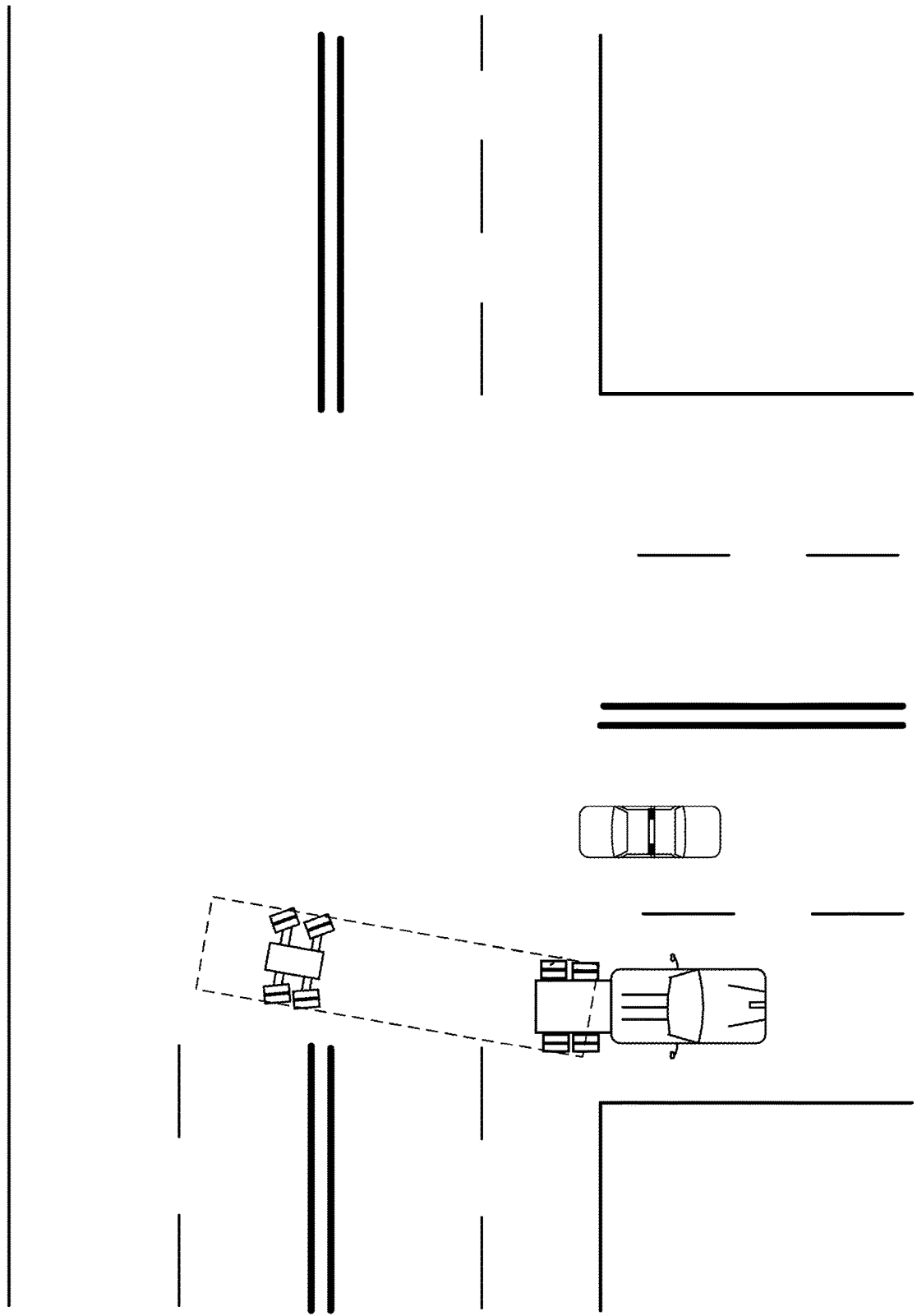

FIGS. 8A-C illustrate a scenario that uses rear steering to avoid a collision with another vehicle during a turn. As shown in view 800 of FIG. 8A, a large vehicle is in one lane and another vehicle is in the adjacent lane. View 810 of FIG. 8B illustrates both vehicles beginning a turn (here a left turn). In a conventional situation, a large vehicle such as a tractor-trailer may need to turn sharply; however, this could bring the vehicle too close to the other vehicle in the adjacent lane. Here, as shown in view 810, the wheel sets of the trailer and the rear wheels of the tractor are actuated to provide a tight turning radius while leaving a sufficient distance from the neighboring vehicle. By way of example, the on-board planner system may determine how much to angle each wheel set in order to make the turn while staying in the same lane and maintaining a minimum (threshold) distance from the other vehicle. View 820 of FIG. 8C illustrates both vehicles as they complete their turns. As shown here, the rear wheels of the tractor have straightened out while the rear wheels of the trailer are still angled.

Figure 9C:
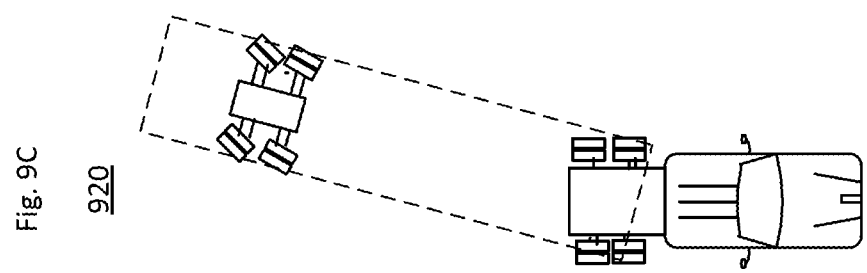
FIGS. 9A-G illustrate a backing-up scenario in accordance with aspects of the technology.
Figure 9B:
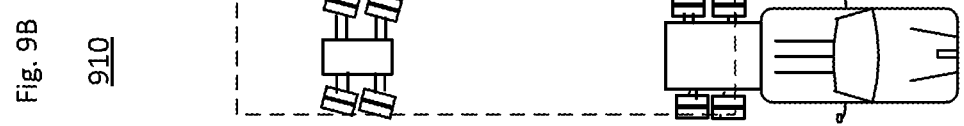
Figure 9A:
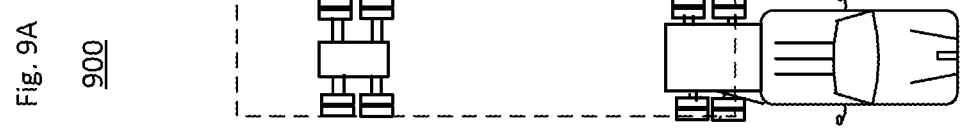
Figure 9E:
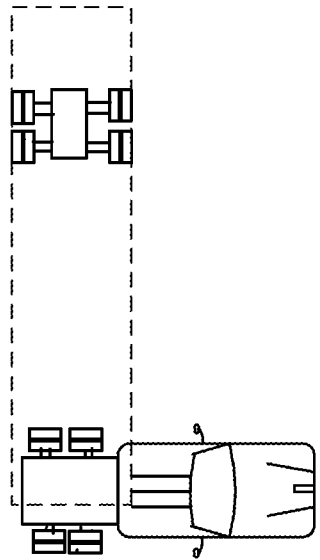
Figure 9D:
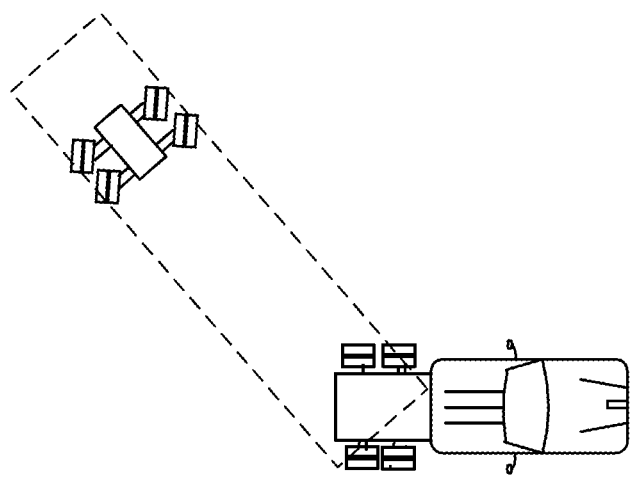
Figure 9G:
Figure 9F:
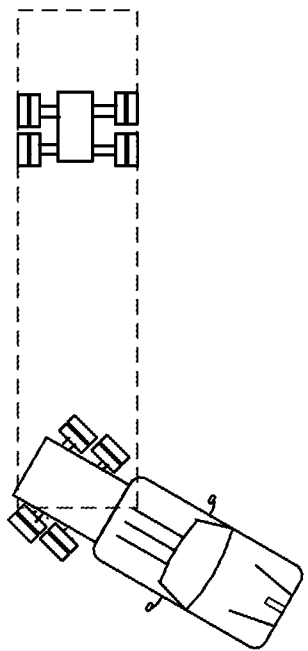

FIGS. 9A-9G present another scenario, in which the rear wheel sets are used to control the rear of a large vehicle while reversing. View 900 of FIG. 9A illustrates a tractor-trailer prior to reversing. View 910 of FIG. 9B shows the rear wheel sets of the trailer adjusted in preparation for reversing. Here, the rear wheel sets may be angled the same or different amounts, and each side may be adjusted differently. View 920 of FIG. 9C shows the truck backing up, with the trailer angled in response to adjustment of the rear wheels. View 930 of FIG. 9D shows the truck continuing backing up, here with some or all of the rear wheels substantially or completely parallel with the direction of movement. As shown in view 940 of 9E, the trailer may be perpendicular to the cab/tractor after backing up. Then as shown in view 950 of FIG. 9F, one or more sets of the tractor's wheels are used to adjust the orientation of the tractor while the trailer's wheels are not adjusted. And view 960 of FIG. 9G illustrates the tractor in line with the trailer upon completion of the maneuver.

Figure 10:
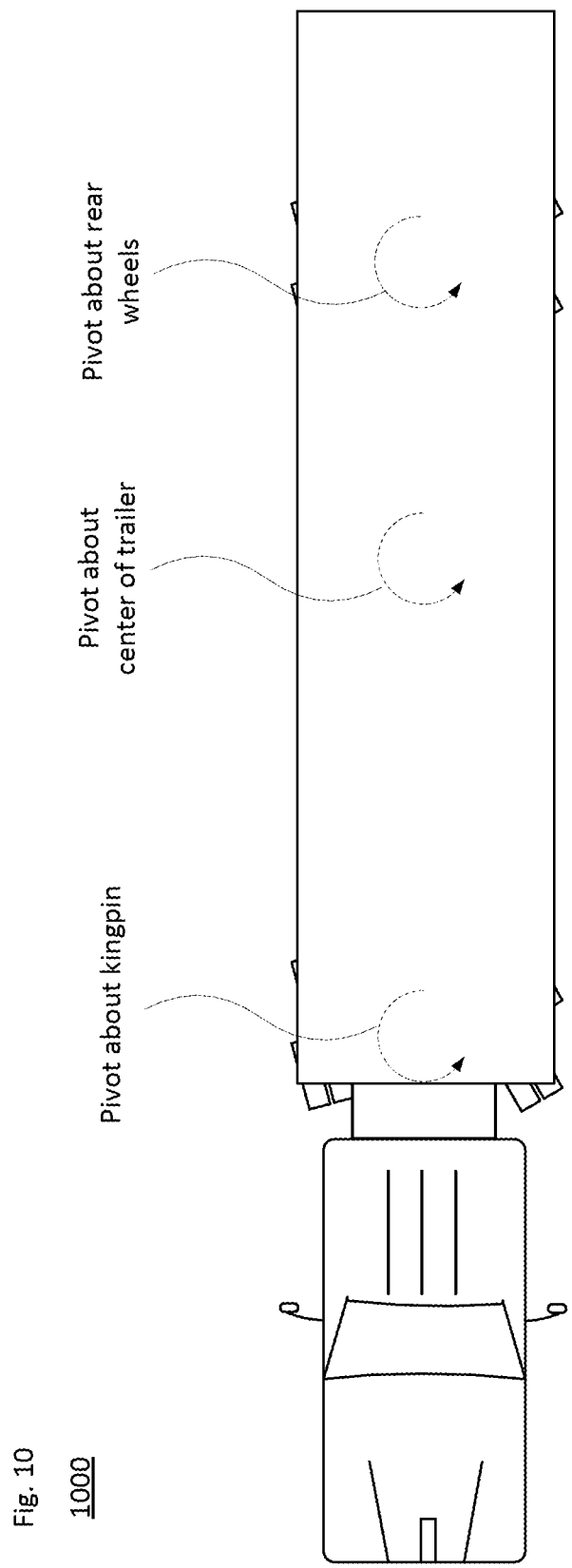
FIG. 10 illustrates a view showing examples where the vehicle is pivotable about different points.

These and other large vehicle adjustment scenarios are performed by enabling individual wheels or wheel sets to move independently of other wheels or wheel sets. This may be done via control over the turning angle, toe angle, camber angle, etc. of each wheel or wheel set. Such refined control allows the system to optimize the turning radius, and effectively negotiate curves, turns, clear objects of varying heights (e.g., curbs) and generally maneuver well in tight spaces. FIG. 10 illustrates a view 1000 showing several examples where the vehicle could pivot about different points, such as about the kingpin, about the rear wheels, or about the center of the trailer. Nonetheless, via selects adjustment of the wheels, a pivot point could be selected along any region of the vehicle.

The height of one or more portions of the vehicle may also be adjustable, for instance using hydraulic adjustment along the respective axle components. Height adjustment may be performed by the planner in accordance with the vehicle model and the received sensor data. Such adjustment could reduce the amount of pitch experienced by the cargo, reduce or increase the height of the trailer to avoid nearby object, or smooth out bumps during a turning or other driving maneuver.

The ability to control specific wheels gives the on-board computer system an additional degree of freedom per additional steerable axle set that can be used when maneuvering. Different trajectories can be planned, for instance depending on different volumes of space that would be swept by the trailer or other portion(s) of the vehicle. In one example, the wheels may be actuated to sweep the narrowest amount of volume, or the volume that avoids curbs or other objects, or avoids jackknifing. In addition, the system may actuate the wheels to adjust the vehicle's axis of rotation or to perform lateral moves.

As noted above, on-board sensors are employed to gather information about the external environment around the vehicle, and can be used to obtain pose and other information about the vehicle itself, such as an accurate trailer position relative to the tractor. Independent wheel actuation may be employed for fine control of the vehicle's positioning, when may reduce blind spots around the vehicle. The on-board control system is able to use the received sensor information and the vehicle model in conjunction with geographic data (e.g., maps) to plan routes or select trajectories that are optimized for vehicle maneuvering. This may include computing an ideal optimized trajectory for the trailer(s) based on a given scenario.

One factor involved in such analysis includes keeping lateral buffers to other nearby vehicles in turns. The buffer(s) may be selected based on the size of the truck, the size and type of nearby vehicles, road and/or weather conditions, etc. Another factor includes avoiding curbs or other static objects along the route, such as street signs, mailboxes, bicycles, scooters or other small vehicles parked by the curb. Yet another factor may include forcing the trailer(s) to go into a certain direction during backup maneuvers such as when parking in a depot or loading dock. This may be done to ensure the swept volume of the vehicle stays within a permissible area of the depot, loading dock or other area. Additional factors may take into account the impact of maneuver options on the wear and tear of the vehicle, as well as load distribution. For instance, active adjustment of the wheels may reduce uneven wearing of the tire tread or reduce stress on the kingpin/fifth wheel coupling. And maneuvers may be chosen to reduce the likelihood of cargo shifts or to correct for them.

Figure 11B:
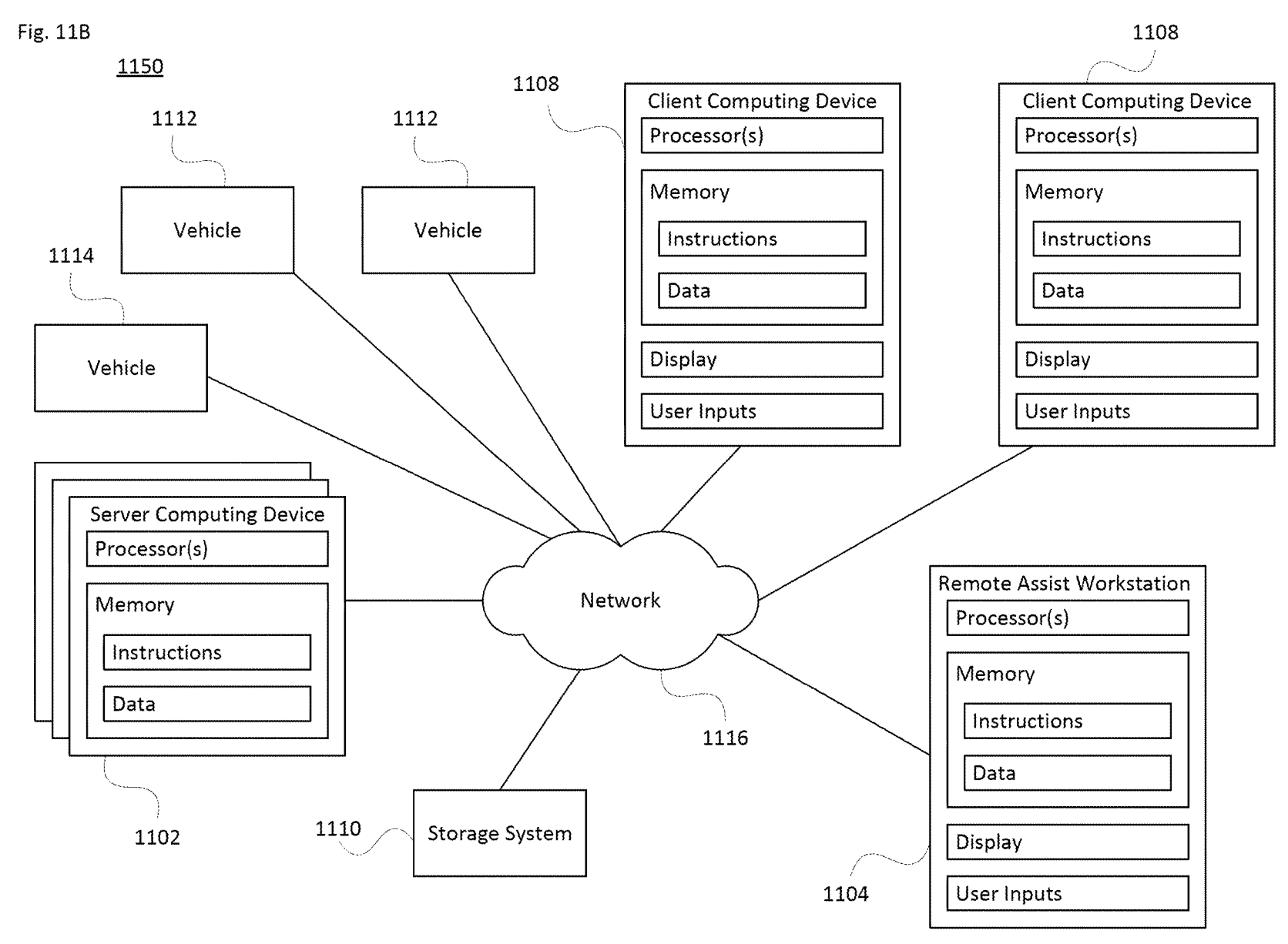

Information regarding route planning and maneuver selection in accordance with independent wheel actuation may also be shared with other vehicles, such as vehicles that are part of a fleet. One example of this is shown in FIGS. 11A and 11B. In particular, FIG. 11A is a pictorial diagram 1100 and FIG. 11B is a functional diagram 1150 of an example system that includes a plurality of computing devices 1102, 1104, 1106, 1108 and a storage system 1110 connected via a network 116. The system also includes vehicles 1112 and 1114, which may be configured the same as or similarly to vehicle 100 of FIGS. 1A-B. Vehicles 1112 and/or vehicles 1114 may be part of a fleet of vehicles. Although only a few vehicles and computing devices are depicted for simplicity, a typical system may include significantly more.

As shown in FIG. 11B, each of computing devices 1102, 1104, 1106 and 1108 may include one or more processors, memory, data and instructions. Such processors, memories, data and instructions may be configured similarly to the ones described above with regard to FIG. 2A.

The various computing devices and vehicles may communicate via one or more networks, such as network 1116. The network 1116, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1102 may include one or more server computing devices having a plurality of computing devices, e.g., a load balanced server farm, that exchange information with different nodes of a network for the purpose of receiving, processing and transmitting the data to and from other computing devices. For instance, computing device 1102 may include one or more server computing devices that are capable of communicating with the computing devices of vehicles 1112 and/or 1114, as well as computing devices 1104, 1106 and 1108 via the network 1116. For example, vehicles 1112 and/or 1114 may be a part of a fleet of vehicles that can be dispatched by a server computing device to various locations, and they may receive updated vehicle models to be used in maneuver and/or route planning. In this regard, the computing device 1102 may function as a dispatching server computing system which can be used to dispatch vehicles to different locations in order to pick up and deliver cargo or pick up and drop off passengers. In addition, server computing device 1102 may use network 1116 to transmit and present information to a user of one of the other computing devices or a passenger of a vehicle. In this regard, computing devices 1104, 1106 and 1108 may be considered client computing devices.

As shown in FIG. 11A each client computing device 1104, 1106 and 1108 may be a personal computing device intended for use by a respective user 1118, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 1106 and 1108 may be mobile phones or devices such as a wireless-enabled PDA, a tablet PC, a wearable computing device (e.g., a smartwatch), or a netbook that is capable of obtaining information via the Internet or other networks.

In some examples, client computing device 1104 may be a remote assistance workstation used by an administrator or operator to communicate with passengers of dispatched vehicles. Although only a single remote assistance workstation 1104 is shown in FIGS. 11A-11B, any number of such workstations may be included in a given system. Moreover, although operations workstation is depicted as a desktop-type computer, operations works stations may include various types of personal computing devices such as laptops, netbooks, tablet computers, etc.

Storage system 1110 can be of any type of computerized storage capable of storing information accessible by the server computing devices 1102, such as a hard-drive, memory card, ROM, RAM, DVD, CD-ROM, flash drive and/or tape drive. In addition, storage system 1110 may include a distributed storage system where data is stored on a plurality of different storage devices which may be physically located at the same or different geographic locations. Storage system 1110 may be connected to the computing devices via the network 1116 as shown in FIGS. 11A-B, and/or may be directly connected to or incorporated into any of the computing devices.

Storage system 1110 may store various types of information. For instance, in addition to vehicle models for each type of vehicle in the fleet, the storage system 1110 may also store autonomous vehicle control software which is to be used by vehicles, such as vehicles 1112 or 1114, to operate such vehicles in an autonomous driving mode. Storage system 1110 may also store map information, route information, weather information, etc. This information may be shared with the vehicles 1112 and 1114, for instance to help with real-time route planning and maneuver evaluation and selection by the on-board computer system(s). The remote assistance workstation 1104 may access the stored information and use it to assist operation of a single vehicle or a fleet of vehicles. By way of example, a lead vehicle may select a route or plan a maneuver and send information about this to the remote assistance workstation 1104. In turn, the remote assistance workstation 904 may disseminate the information to other vehicles in the fleet, so that they may adjust their route plans or select maneuvers accordingly.

In a situation where there is a passenger or remote assistance personnel (e.g., a safety driver) in the vehicle, the vehicle or remote assistance workstation may communicate directly or indirectly with the person's client computing device. Here, for example, information may be provided to the person regarding current driving operations, changes to the route, special maneuvers, etc.

FIG. 12 illustrates an example process 1200 in accordance with the above discussions. In particular, the process provides a method of controlling a vehicle configured to operate in an autonomous driving mode. The vehicle including a plurality of wheels arranged in two or more wheel sets, where each wheel set is configured for independent actuation relative to the other wheel sets. At block 1202, a control system of the vehicle receives sensor data from a perception system of the vehicle. At block 1204, the control system creates a control plan based on the received sensor data. At block 1206, the process includes identifying selected wheels in the two or more wheel sets to adjust based on the control plan. And at block 1208, the identified wheels are actuated independently of one another according to the control plan when operating in the autonomous driving mode Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A vehicle configured to operate in an autonomous driving mode, comprising:
   a driving system including a steering subsystem, an acceleration subsystem and a deceleration subsystem to control driving of the vehicle in the autonomous driving mode;
   a plurality of wheels each configured for independent actuation by the driving system relative to one or more other ones of the plurality of wheels;
   a perception system including one or more sensors configured to detect objects in an environment surrounding the vehicle, each of the one or more sensors being positioned along the vehicle; and
   a control system operatively connected to the driving system and the perception system, the control system having one or more computer processors configured to:
   receive sensor data from the perception system;
   determine a road condition based upon the received sensor data;
   identify selected ones of the plurality of wheels to independently actuate in order to address the road condition; and
   cause actuation of the selected ones of the plurality of wheels independently of one another to adjust a height of at least a portion of the vehicle when operating in the autonomous driving mode to address the road condition.

2. The vehicle of claim 1, wherein the road condition includes an uneven road surface, and actuation of the selected ones of the plurality of wheels is performed to smooth out a ride of the vehicle over the uneven road surface.

3. The vehicle of claim 1, wherein the road condition includes an object along or adjacent to a roadway, and actuation of the selected ones of the plurality of wheels is performed to avoid the object.

4. The vehicle of claim 3, wherein the object is a static object along or adjacent to the roadway.

5. The vehicle of claim 4, wherein the static object is a curb or signage.

6. The vehicle of claim 4, wherein the static object is another vehicle positioned along or adjacent to the roadway.

7. A vehicle configured to operate in an autonomous driving mode, comprising:
   a driving system including a steering subsystem, an acceleration subsystem and a deceleration subsystem to control driving of the vehicle in the autonomous driving mode;
   a plurality of wheels each configured for independent actuation by the driving system relative to one or more other ones of the plurality of wheels;
   a perception system including one or more sensors configured to detect objects in an environment surrounding the vehicle, each of the one or more sensors being positioned along the vehicle; and
   a control system operatively connected to the driving system and the perception system, the control system having one or more computer processors configured to:
   receive sensor data from the perception system;
   create a control plan in accordance with a stored model of the vehicle, wherein the stored model corresponds to a set of physical characteristics of the vehicle;
   plan a trajectory based upon the received sensor data and the stored model of the vehicle;
   identify selected ones of the plurality of wheels to independently actuate to achieve the planned trajectory based on the control plan; and
   cause actuation of the selected ones of the plurality of wheels independently of one another when operating in the autonomous driving mode to achieve the planned trajectory.

8. The vehicle of claim 7, wherein the trajectory is planned to minimize a turning radius of the vehicle when making a turn while maintaining a threshold distance from an object detected in the received sensor data.

9. The vehicle of claim 7, wherein the trajectory is planned to achieve an in-lane driving adjustment while maintaining a threshold distance from an object detected in the received sensor data.

10. The vehicle of claim 7, wherein the trajectory is planned for the vehicle to pull out of a parking spot.

11. The vehicle of claim 7, wherein the one or more computer processors are further configured to plan the trajectory based upon a weather condition in an external environment of the vehicle.

12. The vehicle of claim 7, wherein the trajectory is planned for the vehicle to perform a reverse driving maneuver.

13. The vehicle of claim 7, wherein the trajectory is planned according to a load distribution of the vehicle.

14. The vehicle of claim 7, wherein the trajectory is planned for the vehicle to achieve a selected position relative to a curb.

15. The vehicle of claim 7, wherein the trajectory is planned to achieve a selected positioning of the vehicle when accessing a loading area.

16. The vehicle of claim 7, wherein the stored model of the vehicle is used to plan the trajectory according to a swept volume of space criteria.

17. A method for operating a vehicle in an autonomous driving mode, the method comprising:
   receiving, by one or more processors of a vehicle control system, sensor data from a perception system of the vehicle;
   determining, by the one or more processors, a road condition based upon the received sensor data;
   identifying, by the one or more processors, selected ones of a plurality of wheels of the vehicle to independently actuate in order to address the road condition; and
   actuating the selected ones of the plurality of wheels independently of one another to adjust a height of at least a portion of the vehicle when operating in the autonomous driving mode to address the road condition.

18. The method of claim 17, wherein the road condition includes:
   an uneven road surface, and actuating the selected ones of the plurality of wheels is performed to smooth out a ride of the vehicle over the uneven road surface; or
   an object along or adjacent to a roadway, and actuating the selected ones of the plurality of wheels is performed to avoid the object.

19. A method for operating a vehicle in an autonomous driving mode, the method comprising:
- receiving, by one or more processors of a vehicle control system, sensor data from a perception system of the vehicle;
- creating, by the one or more processors, a control plan in accordance with a stored model of the vehicle, wherein the stored model corresponds to a set of physical characteristics of the vehicle;
- planning, by the one or more processors, a trajectory based upon the received sensor data and the stored model of the vehicle;
- identifying, by the one or more processors, selected ones of a plurality of wheels of the vehicle to independently actuate to achieve the planned trajectory based on the control plan; and
- actuating the selected ones of the plurality of wheels independently of one another when operating in the autonomous driving mode to achieve the planned trajectory.

20. The method of claim 19, wherein the trajectory is further planned based upon a weather condition in an external environment of the vehicle.

* * * * *